United States Patent
Dahl et al.

(10) Patent No.: US 11,242,905 B2
(45) Date of Patent: Feb. 8, 2022

(54) VOID CELLS WITH OUTWARDLY CURVED SURFACES

(71) Applicant: Skydex Technologies, Inc., Centennial, CO (US)

(72) Inventors: Jerod Dahl, Centennial, CO (US); Peter Foley, Castle Rock, CO (US); Thomas Christopher Manney, Bennett, CO (US)

(73) Assignee: SKYDEX TECHNOLOGIES, INC., Centennial, CO (US)

( * ) Notice: Subject to any disclaimer, the term of this patent is extended or adjusted under 35 U.S.C. 154(b) by 169 days.

(21) Appl. No.: 15/748,702

(22) PCT Filed: Aug. 1, 2016

(86) PCT No.: PCT/US2016/045049
§ 371 (c)(1),
(2) Date: Jan. 30, 2018

(87) PCT Pub. No.: WO2017/023870
PCT Pub. Date: Feb. 9, 2017

(65) Prior Publication Data
US 2019/0003549 A1    Jan. 3, 2019

Related U.S. Application Data

(60) Provisional application No. 62/219,451, filed on Sep. 16, 2015, provisional application No. 62/199,810, filed on Jul. 31, 2015.

(51) Int. Cl.
*F16F 1/373* (2006.01)
*F16F 7/12* (2006.01)
(Continued)

(52) U.S. Cl.
CPC ............. *F16F 7/121* (2013.01); *A43B 7/34* (2013.01); *A43B 13/181* (2013.01);
(Continued)

(58) Field of Classification Search
CPC ......... F16F 1/3737; F16F 3/0876; B32B 3/28; B32B 3/30
See application file for complete search history.

(56) References Cited

U.S. PATENT DOCUMENTS 4,541,136 A    9/1985   Graebe
4,993,202 A *   2/1991   Thiel ................ E04F 15/02429
                                                                                                    428/180
(Continued)

FOREIGN PATENT DOCUMENTS

JP          10-094402 A     4/1998
WO     WO-2016174431 A1 * 11/2016  ............. F16F 1/376

OTHER PUBLICATIONS

International Search and Written Opinion, Korean Intellectual Property Office, Nov. 17, 2016.
(Continued)

*Primary Examiner* — Bradley T King
(74) *Attorney, Agent, or Firm* — Holzer Patel Drennan

(57) ABSTRACT

Implementation described and claimed herein include a cushioning structure and method for manufacturing a cellular cushioning system, which allows for maximum comfort through the compression and shock cycle. Specifically, a cushioning structure comprises void cells formed in an array, which comprise multiple outwardly curved surfaces, with varying radius measurements. Stiffness in the void cells can vary by varying the Radii. Outwardly curved surfaces prevent buckling and provide support for high impact by absorbing energy.

12 Claims, 23 Drawing Sheets

(51) Int. Cl.
  B32B 7/14      (2006.01)
  B32B 27/08     (2006.01)
  B32B 25/08     (2006.01)
  B65D 81/03     (2006.01)
  B65D 81/05     (2006.01)
  A43B 7/34      (2006.01)
  A43B 13/18     (2006.01)
  B32B 27/30     (2006.01)
  B32B 27/28     (2006.01)
  A43B 13/20     (2006.01)
  B32B 25/04     (2006.01)
  B32B 3/26      (2006.01)
  A42B 3/12      (2006.01)
  A41D 13/015    (2006.01)

(52) U.S. Cl.
  CPC ............ *A43B 13/189* (2013.01); *A43B 13/20* (2013.01); *B32B 3/26* (2013.01); *B32B 7/14* (2013.01); *B32B 25/042* (2013.01); *B32B 25/08* (2013.01); *B32B 27/08* (2013.01); *B32B 27/28* (2013.01); *B32B 27/302* (2013.01); *B65D 81/03* (2013.01); *B65D 81/05* (2013.01); *F16F 1/3737* (2013.01); *A41D 13/0156* (2013.01); *A42B 3/124* (2013.01); *B32B 2307/56* (2013.01); *B32B 2307/732* (2013.01); *B32B 2437/02* (2013.01); *B32B 2471/04* (2013.01); *B32B 2479/00* (2013.01); *B32B 2553/02* (2013.01)

(56) References Cited

U.S. PATENT DOCUMENTS

| | | | | |
|---|---|---|---|---|
| 5,052,068 | A | 10/1991 | Graebe | |
| 5,851,626 | A * | 12/1998 | McCorry | B60N 3/048 428/95 |
| 6,029,962 | A | 2/2000 | Shorten et al. | |
| 6,777,062 | B2 * | 8/2004 | Skaja | B32B 3/26 428/143 |
| 8,056,962 | B2 * | 11/2011 | Tauchi | B60R 21/04 296/187.05 |
| 8,904,584 | B2 * | 12/2014 | Sugano | B32B 7/04 5/652 |
| 2001/0031339 | A1 * | 10/2001 | Johnson | B32B 3/28 428/179 |
| 2002/0013967 | A1 | 2/2002 | Roux | |
| 2002/0119276 | A1 | 8/2002 | Skaja | |
| 2004/0067820 | A1 * | 4/2004 | Noble | A63B 5/06 482/18 |
| 2005/0028403 | A1 | 2/2005 | Swigart et al. | |
| 2005/0074586 | A1 | 4/2005 | Skaja | |
| 2006/0277685 | A1 | 12/2006 | Foley et al. | |
| 2007/0147956 | A1 * | 6/2007 | Spingler | F16F 7/125 404/6 |
| 2007/0187961 | A1 * | 8/2007 | Audi | A62B 1/22 293/134 |
| 2007/0277396 | A1 | 12/2007 | Swigart | |
| 2008/0056824 | A1 * | 3/2008 | Blackwood | E02B 11/00 405/36 |
| 2010/0258988 | A1 | 10/2010 | Darnell et al. | |
| 2011/0283876 | A1 | 11/2011 | Foley et al. | |
| 2012/0175206 | A1 | 7/2012 | Kanous | |
| 2013/0142985 | A1 | 6/2013 | Yang | |
| 2013/0326819 | A1 * | 12/2013 | Wyman | A47C 27/007 5/738 |
| 2011/4030490 | | 4/2014 | Sugano et al. | |
| 2014/0210250 | A1 | 7/2014 | Difelice et al. | |
| 2015/0033577 | A1 | 2/2015 | Dahl et al. | |
| 2015/0072103 | A1 | 3/2015 | Tresso et al. | |
| 2015/0165724 | A1 * | 6/2015 | Cox | B21B 1/22 428/573 |
| 2015/0233118 | A1 * | 8/2015 | Brun | E04C 2/36 428/131 |
| 2016/0066649 | A1 | 3/2016 | Foley et al. | |
| 2016/0235132 | A1 | 8/2016 | Sugano et al. | |
| 2017/0008249 | A1 | 1/2017 | Parsons et al. | |
| 2017/0027336 | A1 | 2/2017 | Wyman et al. | |
| 2017/0072653 | A1 | 3/2017 | Dahl et al. | |
| 2017/0208960 | A1 | 7/2017 | Sugano et al. | |
| 2019/0063538 | A1 * | 2/2019 | Audi | F16F 1/025 |

OTHER PUBLICATIONS

Translated Office Action dated Mar. 20, 2019 for Chinese Patent 201680045031.6.
Communication pursuant to Article 94(3) EPC, dated Jan. 29, 2020, issued by the European Patent Office for European Patent Application 16833692.3.
Examination Report dated Mar. 27, 2020, issued by the Australian Government Intellectual Property Office for Australian Application 2016303585.
Examination Report issued by Indian Patent Office dated Jul. 29, 2020, for Indian Patent Application 201817001970.
Examination Report issued by Australian Patent Office dated Dec. 14, 2020, for Australian Patent Application 2016303585.
Search Report completed by European Patent Office dated Nov. 27, 2020, for European U.S. Appl. No. 20/208,464.

* cited by examiner

2200

| Configuration | Load Force (N) | | | |
| --- | --- | --- | --- | --- |
| | 10% Compression | 25% Compression | 50% Compression | 75% Compression |
| TS | 117 | 252 | 350 | 855 |
| A (Figs. 1, 3) | 340 | 613 | 765 | 1410 |
| B (Figs. 4, 5) | 243 | 492 | 697 | 1445 |
| C (Figs. 6, 7) | 297 | 786 | 769 | 1419 |
| D (Figs. 8, 9) | 237 | 444 | 653 | 1292 |
| E (Figs. 10, 11) | 229 | 432 | 518 | 1168 |
| F (Figs. 12, 13, 14) | 232 | 457 | 535 | 1417 |
| G (Figs. 15, 16, 17) | 376 | 654 | 709 | 1214 |

FIG. 22

VOID CELLS WITH OUTWARDLY CURVED SURFACES

CROSS REFERENCE TO RELATED APPLICATIONS

The present application claims priority to U.S. Provisional Patent Application Ser. No. 62/199,810, entitled "VOID CELLS WITH OUTWARD FACING CURVATURE," filed on Jul. 31, 2015, all of which is specifically incorporated by reference for all it discloses and teaches.

TECHNICAL FIELD

This invention relates generally to cushioning systems and methods of manufacturing the same.

BACKGROUND

Cushioning systems are used in a wide variety of applications including comfort and impact protection of the human body. A cushioning system is placed adjacent a portion of the body and provides a barrier between the body and one or more objects that would otherwise impinge on the body. For example, a pocketed spring mattress contains an array of close-coupled metal springs that cushion the body from a bed frame. Similarly, footwear, chairs, gloves, kneepads, helmets, etc. may each include a cushioning system that provides a barrier between a portion of the body and one or more objects.

A variety of structures are used for cushioning systems. For example, an array of close-coupled, closed-cell air and/or water chambers often constitutes air and water mattresses. An array of close-coupled springs often constitutes a conventional mattress. Further examples include open or closed cell foam and elastomeric honeycomb structures.

For cushioning systems utilizing an array of closed or open cells or springs, either the cells or springs are directly coupled together or one or more unifying layers are used to couple each of the cells or springs together at their extremities. Directly coupling the cells or springs together or indirectly coupling the extremities of the cells or springs together is effective in tying the cushioning system together.

SUMMARY

Implementations described and claimed herein include a cushioning structure and method for manufacturing a cellular cushioning system, which allows for maximum comfort through the compression and shock cycle. Specifically, a cushioning structure comprises mutated void cells formed in an array, which comprise of multiple outwardly curved surfaces of varying radius measurements. Stiffness in the void cells can be manipulated by varying the radii. The outwardly curved surfaces prevent buckling and provide support for high impact by absorbing energy.

Other implementations are also described and recited herein.

BRIEF DESCRIPTIONS OF THE DRAWINGS

FIG. 22 shows a table of load force based on 10%, 25%, 50%, and 75% compression for the void cells in arrays of the described cushioning systems.

DETAILED DESCRIPTIONS

The disclosed technology includes a cushioning structure, which allows for maximum comfort through the compression and shock cycle. Specifically, a cushioning structure comprises of mutated void cells formed in an array or a sheet, which comprise of multiple outwardly curved surfaces, with varying radius measurements. The elastic modulus or stiffness in the void cells can be manipulated by varying the number, the depths, and the locations (e.g., vertical height) of the radii in the void cells. The outwardly curved surfaces dominate the overall design of the void cell and prevent buckling and provide support for high impact by absorbing energy. The void cells in the disclosed technology can withstand over multiple compressions without significant degradation.

Void cells without outwardly curved surfaces can experience buckling and loss of support in void cells during impact. The void cells without outwardly curved surfaces can displace too rapidly and not absorb as much energy.

Therefore, it is beneficial to have a configuration that does not endure stress concentrations within the material itself (e.g., folds that might create a crack over time or create a significant decrease in force deflection performance over time).

The disclosed technology can be used in a variety of comfort-impact-protection and pressure-distribution cushioning applications, including, but not limited to: footwear, mattresses, furniture cushioning, body padding, and packaging. In one implementation, the void cells comprising multiple outwardly curved surfaces can support footwear capable of withstanding threes times a user's body weight during use.

Figure 1:
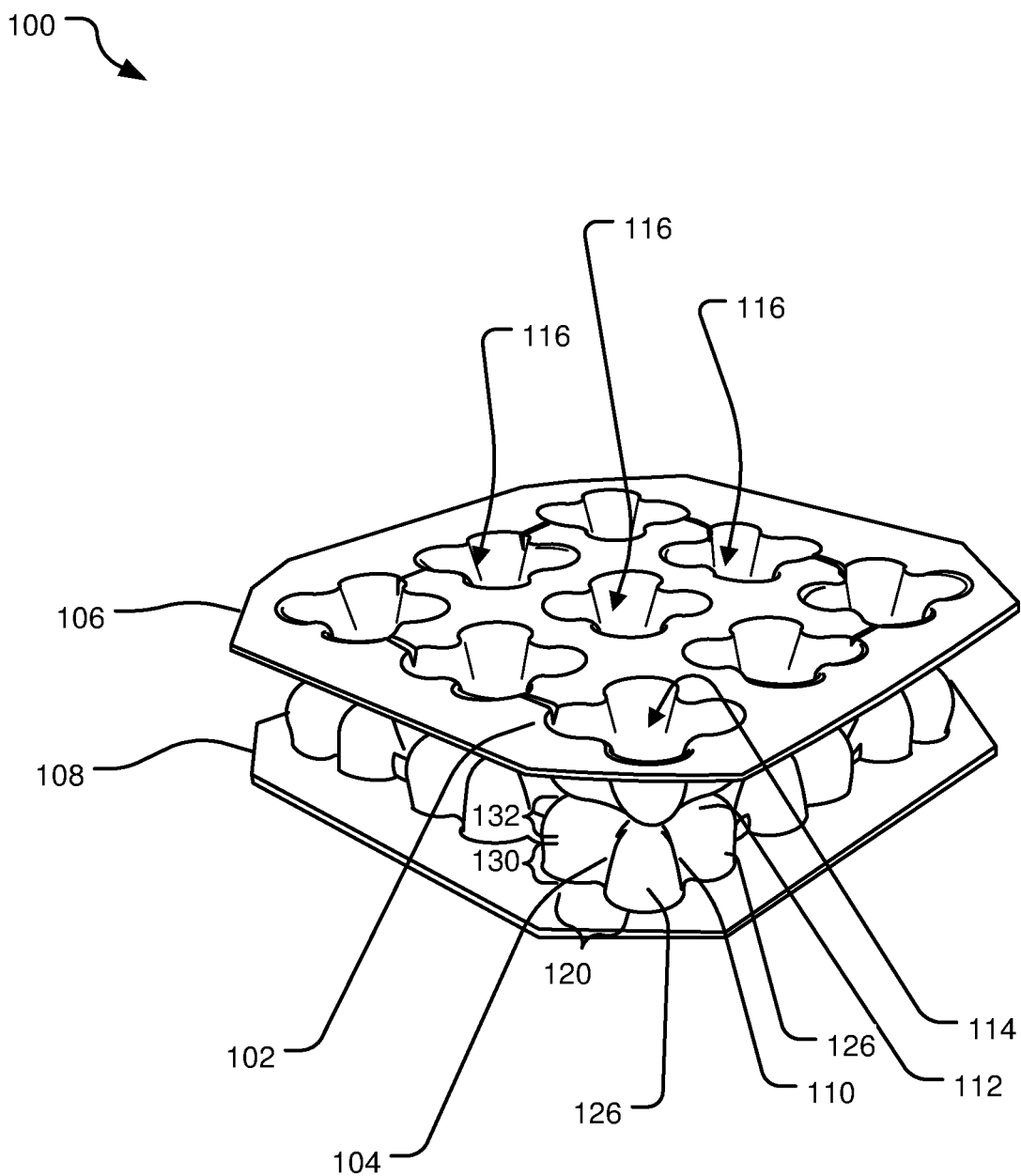
FIG. 1 illustrates a perspective view of an example cellular cushioning system in an unloaded state.

FIG. 1 illustrates a perspective view of an example cellular cushioning system 100 in an unloaded state. The cellular cushioning system 100 includes void cells (e.g., void cell 102 or void cell 104) arranged in two arrays. In other implementations, there can be one or more than two arrays of void cells. The arrays can be flat or curved.

For purposes of this disclosure, the arrays in example cellular cushioning systems 100 that include two arrays are described as a first array (e.g., first array 106) and a second array (e.g., second array 108). However, in another implementation, the first array and second array could be referred to as right side and left side arrays, top and bottom arrays, or other named features depending on desired terminology or configurations. In implementations with more than one array in the cellular cushioning system 100, the void cells 104 in each array may have the same or different geometries as another array. Additionally, the void cells 104 within a single array can have the same or different geometries from each other.

In FIG. 1, the first array 106 and the second array 108 have void cells (e.g., void cell 104), which comprise of four outwardly curved surfaces (e.g., outwardly curved surfaces 110), each outwardly curved surface in each sidewall (e.g., sidewall 120) of each void cell 104) in the first array 106 and the second array 108 in the cellular cushioning system 100. The outwardly curved surfaces are located on the sidewalls of the void cells and are curvatures facing naturally away from the interior of the void cell. The outwardly curved surfaces constitute a substantial portion of the overall exterior surface area of the void cell 104, defined as greater than or equal to 20% of the overall exterior surface area of the void cell 104.

Each void cell 104 also comprises of four inwardly curved surfaces (e.g., inwardly curved surfaces 126), wherein one inwardly curved surface constitutes a rounded corner of the void cell 100. In FIG. 1, the inwardly curved surfaces are located on the corners of the void cells and are curvatures facing inwardly toward the interior of the void cells.

In implementations of the disclosed technology, the outwardly curved surfaces and inwardly curved surfaces can be configured in a sidewall of a void cell or on a corner of a void cell. In some implementations, there can be two, three, or more curved surfaces (or interchangeably referred herein as curvatures) in each void cell. In some implementations, there may be more than one curvature in a sidewall of a void cell. For example, there may be a wave of curvatures in the sidewalls (e.g., about 12 oscillations yielding a very stiff cell). In other implementations, there may be no curvatures in one or more sidewalls.

In some implementations, a cubic shape of a base portion (e.g., base portion 130) of a void cell can adopt the slope of its cubic shape of an adjacent or adjoined void cell (e.g., void cell 104). The base portion 130 can be defined as a portion of the void cell adjacent to a peak portion (peak portion 132), which forms at least a medial portion of a void cell. The peak portion 132 may be defined as a portion of the void cell adjacent to a base portion 130, which includes a peak surface (e.g., peak surface 112) that may attach to a peak surface of an opposing void cell in another array (not shown) of the void cell (e.g., void cell 104). The peak portion 132 may be significantly rounded or segmented as a result of a larger radius or of a deeper depth of each outwardly curved surface (e.g., outwardly curved surface 110), or by the number of outwardly curved surfaces present in each void cell. A larger radius of the outwardly curved surfaces may be approximately 50% of the length of the void cell or less. In one example, the larger radius of the outwardly curved surfaces may be approximately 20 mm. In another example, a larger radius may be half the length of the void cell 104 less 1 mm. (The radii and depths of the outwardly curved surfaces are described in detail in FIG. 2.)

Figure 15:
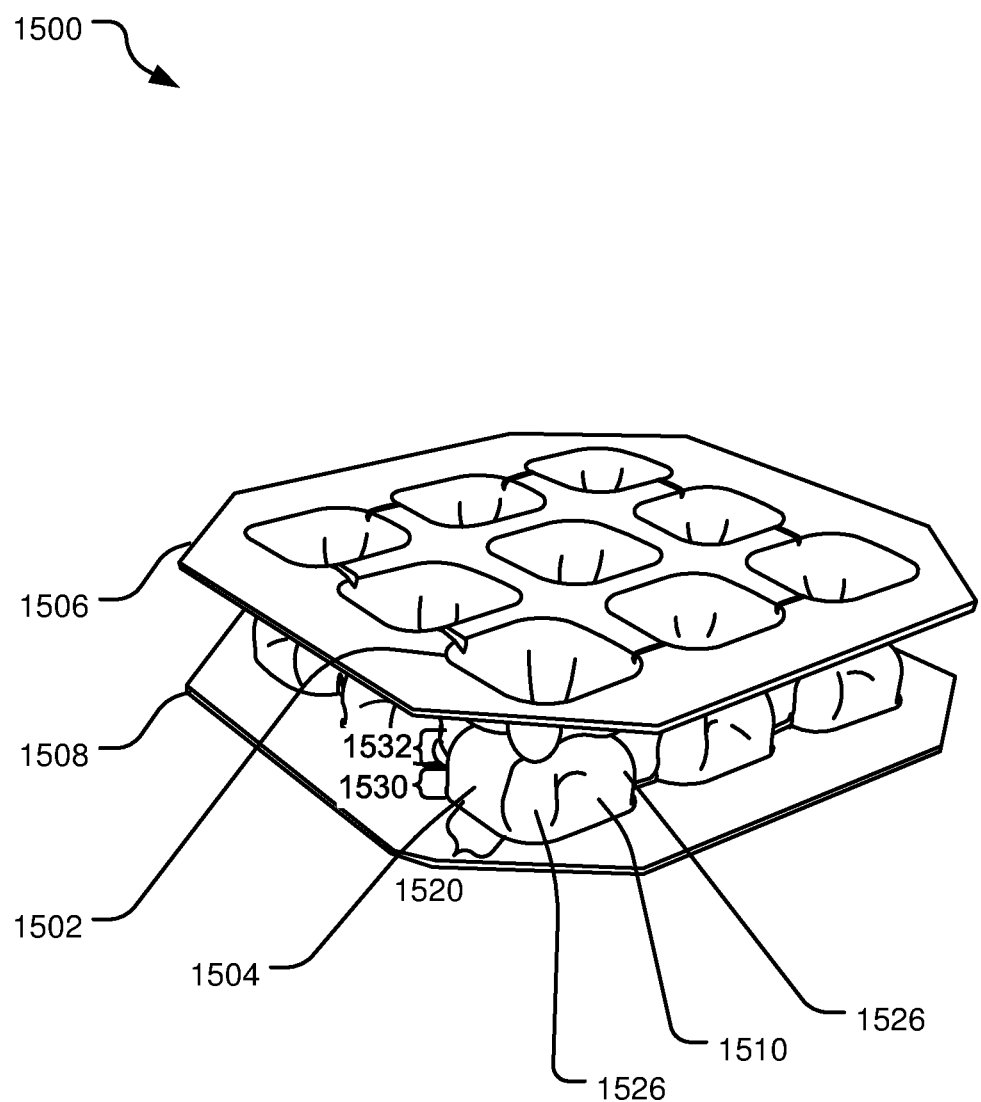
FIG. 15 illustrates a perspective view of an example cellular cushioning system in an unloaded state.
Figure 18:
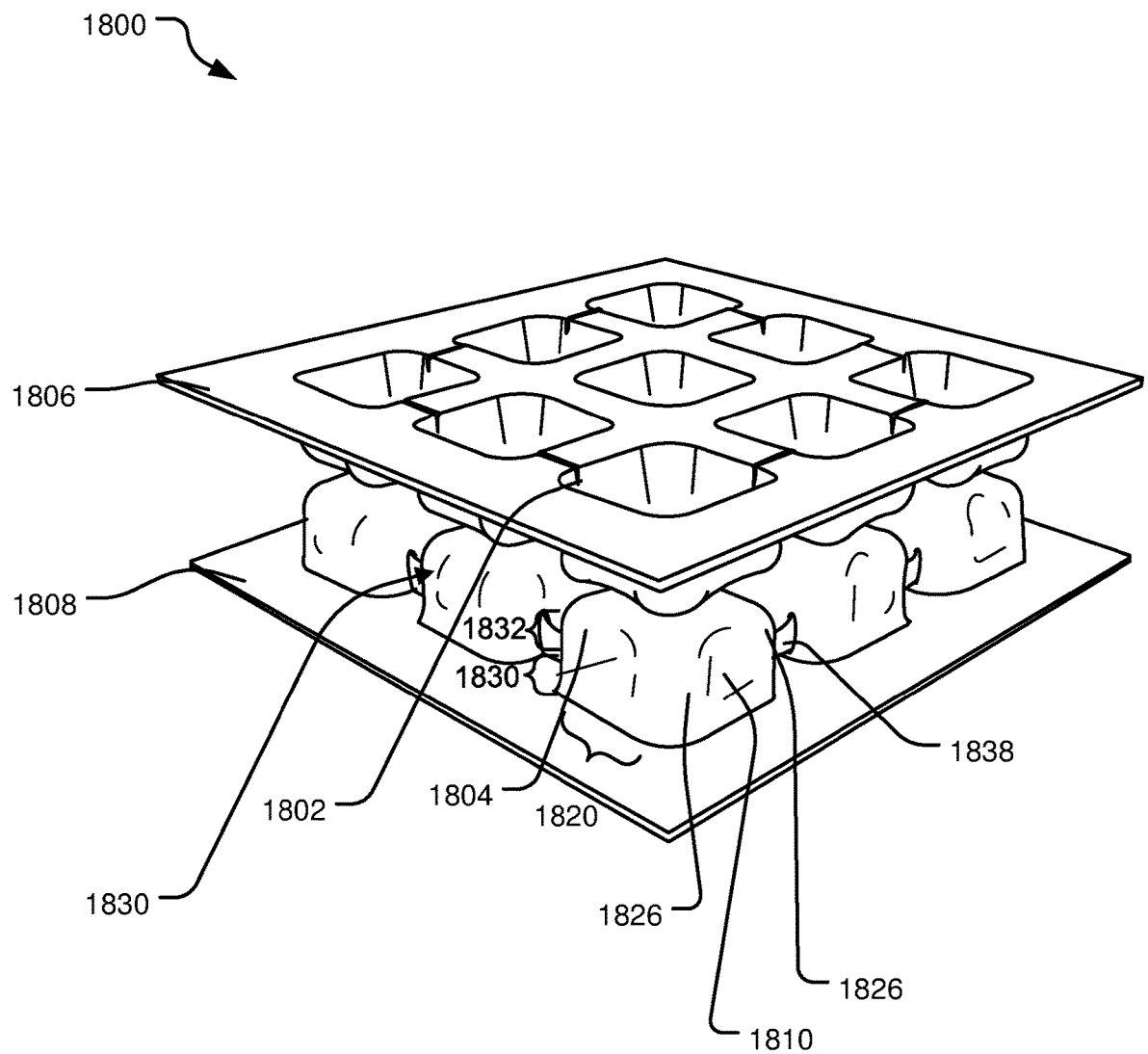
FIG. 18 illustrates a perspective view of an example cellular cushioning system in an unloaded state.

In some implementations, the base portion 130 includes only the inwardly curved surfaces and a peak portion 112 that includes both the outwardly curved surfaces 110 and the inwardly curved surfaces 126 (see e.g., FIGS. 15 and 18). In other implementations, the peak portion of a void cell 104 can be less rounded or segmented as a result of a smaller radius or of a shallower depth of each outwardly curved surface, or by the number of outwardly curved surfaces present in each void cell 104 (see, for example, the less rounded and segmented peak portion of the void cells 104 with the smaller radius of outwardly curved surface and smaller number of outwardly curved surfaces in FIGS. 4, 8 and 9). A smaller radius may be approximately 1 mm. Cross sections of outwardly curved surface in the walls of a void cell 104 may vary from a minimal indention, as minimally required to break the line running from the tangent from one corner of the void cell 104 to the next corner of the void cell 104, to as great as an ellipse, which extends into the void cell 104 by half its width. Similarly, the opening or top (e.g., opening 114) of the void cell 104 can vary in shape as a result of a smaller radius or of a shallower depth of each outwardly curved surface, or by the number of outwardly curved surfaces present in each void cell 104. The opening or top of the void cell 104 can be open to atmosphere.

In other implementations, outwardly curved surfaces can be molded only in the peak portion, only in the base portion, or in both the peak portion and the base portion. Stiffness can be varied depending on the molding of these different patterns.

The cellular cushioning system 100 may be manufactured using a variety of manufacturing processes (e.g., blow molding, thermoforming, extrusion, injection molding, laminating, etc.). For example, in one implementation, the cellular cushioning system 100 may be manufactured via single array sheet or roll-fed. In one implementation, the system 100 is manufactured by forming two separate arrays, a first array 106 and a second array 108. The two arrays are then laminated, glued, or otherwise attached together at the peak surfaces of the peak portion of the void cells in the first array 106 and the second array 108. For example, the peak surfaces of the peak portions of the void cells (e.g., peak surface 112 of void cell 104) of the first array 106 are attached to the peak surfaces (e.g., peak surface of void cell 102 (not shown)) of the peak portions of the void cells 104 of the second array 108.

The void cells 104 are hollow chambers that resist deflection due to compressive forces, similar to compression springs. At least the material, wall thickness, size, and shape of each of the void cells 104 define the resistive force each of the void cells can apply. Materials used for the void cells 104 are generally elastically deformable under expected load conditions and will withstand numerous deformations without fracturing or suffering other breakdown impairing the function of the cellular cushioning system 100. Example materials include thermoplastic urethane, thermoplastic elastomers, styrenic co-polymers, rubber, ethyl acetate, Dow Pellethane®, Lubrizol Estane®, Dupont™ Hytrel®, ATOFINA Pebax®, and Krayton polymers. Further, the wall thickness may range from 5 mil to 160 mil. Still further, the size of each of the void cells may range from 5 mm to 70 mm sides in a cubical implementation. Further yet, the void cells may be cubical, pyramidal, hemispherical, or any other shape capable of having a hollow interior volume. Other shapes may have similar dimensions as the aforementioned cubical implementation. Still further, the void cells may be spaced a variety of distances from one another. An example spacing range is 2.5 mm to 150 mm.

In one implementation, the void cells 104 have a square or rectangular base shape, with a trapezoidal volume and a rounded top. That void cell 104 geometry may provide a smooth compression profile of the system 100 and minimal bunching of the individual void cells 104. Bunching occurs particularly on corners and vertical sidewalls of the void cells where the material buckles in such a way as to create multiple folds of material that can cause pressure points and a less uniform feel to the cellular cushioning system overall.

The material, wall thickness, cell size, and/or cell spacing of the void cells 104 within the cellular cushioning system 100 may be optimized to minimize generation of mechanical noise by compression (e.g., buckling of the sidewalls) of the void cells. For example, properties of the void cells 104 may be optimized to provide a smooth relationship between displacement and an applied force. Further, a light lubricating coating (e.g., talcum powder or oil) may be used on the exterior of the void cells 104 to reduce or eliminate noise generated by void cells contacting and moving relative to one another. Reduction or elimination of mechanical noise may make use of the cellular cushioning system 100 more pleasurable to the user.

Each void cell 104 can be surrounded by neighboring void cells within an array. For example, void cell 102 is surrounded by three neighboring void cells 116 within the first array 106. In cellular cushioning system 100, there are three neighboring void cells for each corner void cell, five neighboring void cells for each edge cell, and eight neighboring void cells for the center void cell. Other implementations may have greater or fewer neighboring void cells for each void cell.

Further, in implementations where an array has an opposite array, each void cell may have a corresponding opposing void cell within the opposite array. For example, void cell 102 in the first array 106 is opposed by void cell 104 in the second array 108. Other implementations do not include opposing void cells for some or all of the void cells.

The neighboring void cells and opposing void cells are collectively referred to herein as adjacent void cells. In various implementations, one or more of the neighboring void cells, opposing void cells, and opposing neighbor void cells are not substantially compressed within an independent compression range of an individual void cell.

In one implementation, the void cells are filled with ambient air. In another implementation, the void cells are filled with a foam or a fluid other than air. The foam or certain fluids may be used to insulate a user's body, facilitate heat transfer from the user's body to/from the cellular cushioning system 100, and/or affect the resistance to deflection of the cellular cushioning system 100. In a vacuum or near-vacuum environment (e.g., outer space), the hollow chambers may be un-filled.

Further, the void cells may have one or more apertures or holes (not shown) through which air or other fluid may pass freely when the void cells are compressed and de-compressed. By not relying on air pressure for resistance to deflection, the void cells can achieve a relatively constant resistance force to deformation. Still further, the void cells may be open to one another (i.e., fluidly connected) via passages (not shown) through the array. The holes and/or passages may also be used to circulate fluid for heating or cooling purposes. For example, the holes and/or passages may define a path through the cellular cushioning system 100 in which a heating or cooling fluid enters the cellular cushioning system 100, follows a path through the cellular cushioning system 100, and exits the cellular cushioning system 100. The holes and/or passages may also control the rate at which air may enter, move within, and/or exit the cellular cushioning system 100. For example, for heavy loads that are applied quickly, the holes and/or passages may restrict how fast air may exit or move within the cellular cushioning system 100, thereby providing additional cushioning to the user.

The holes may be placed on mating surfaces of opposing void cells on the cellular cushioning system 100 to facilitate cleaning. More specifically, water and/or air could be forced through the holes in the opposing void cells to flush out contaminants. In an implementation where each of the void cells is connected via passages, water and/or air could be introduced at one end of the cellular cushioning system 100 and flushed laterally through the cellular cushioning system 100 to the opposite end to flush out contaminants. Further, the cellular cushioning system 100 could be treated with an anti-microbial substance or the cellular cushioning system 100 material itself may be anti-microbial.

Figure 2A:
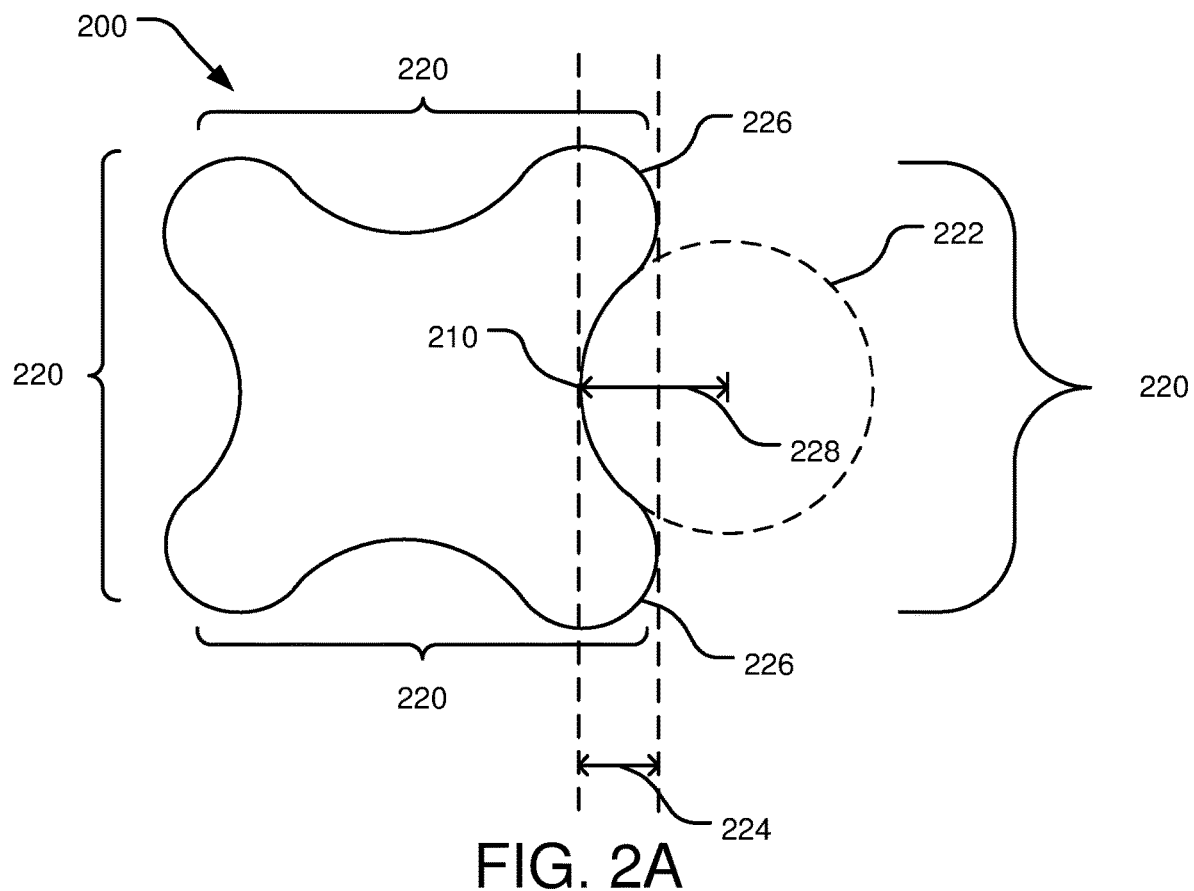
FIG. 2A illustrates a top view of an example base portion of a void cell in one array of the example cellular cushioning system.

FIG. 2A illustrates a top view of an example base portion of a void cell 200 in one array of the example cellular cushioning system. The base portion of the void cell 200 is cube-shaped with four sidewalls 220. The four sidewalls 220 each have one outwardly curved surface (outwardly curved surface 210) and two inwardly curved surfaces (inwardly curved surfaces 226). The outwardly curved surfaces 210 have curvatures that face away from the interior of the void cell 200. The inwardly curved surfaces 226 have curvatures that face toward the interior of the void cell 200.

Figure 3:
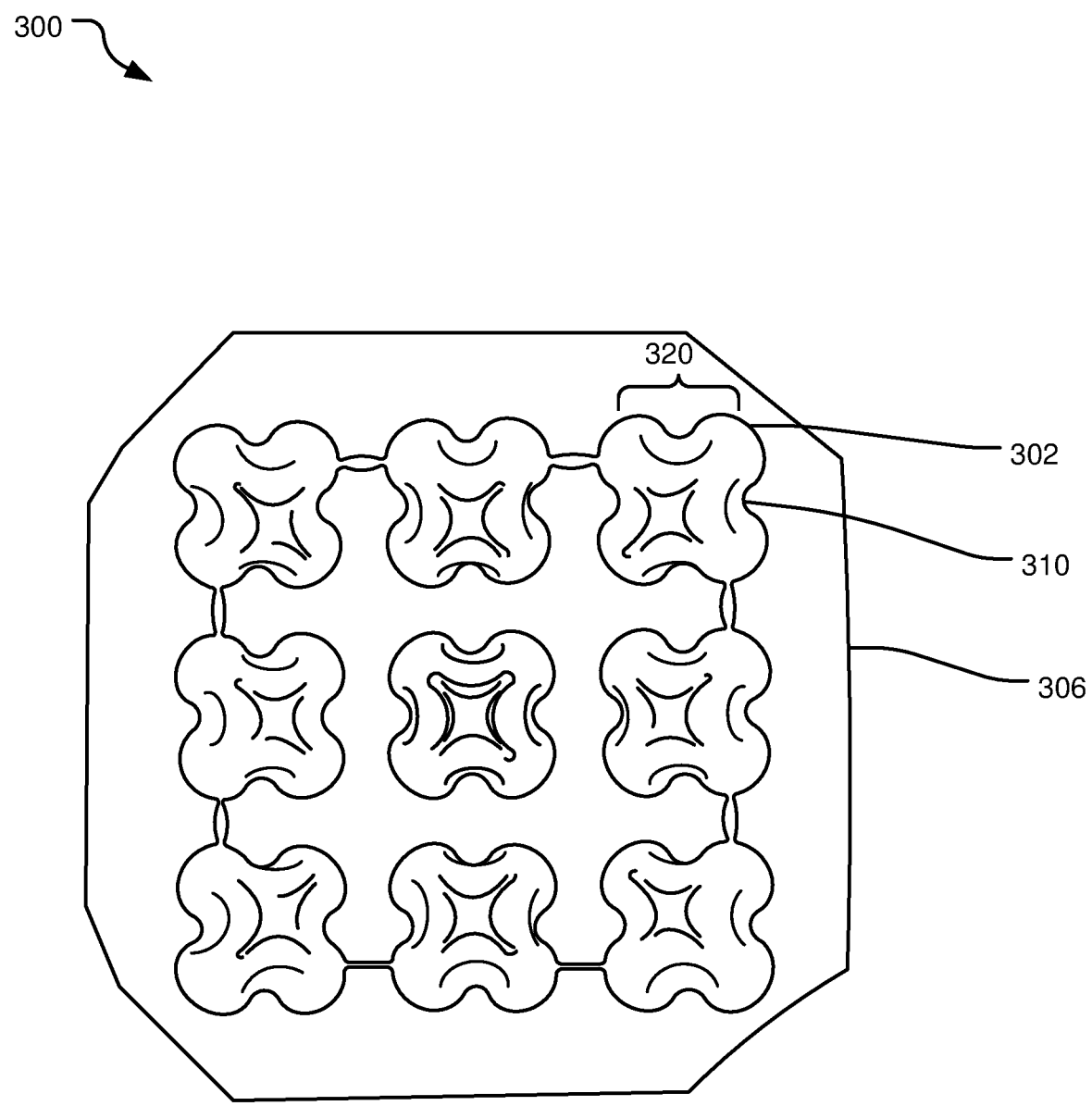
FIG. 3 illustrates a top view of the example cellular cushioning system in FIG. 1.
Figure 5:
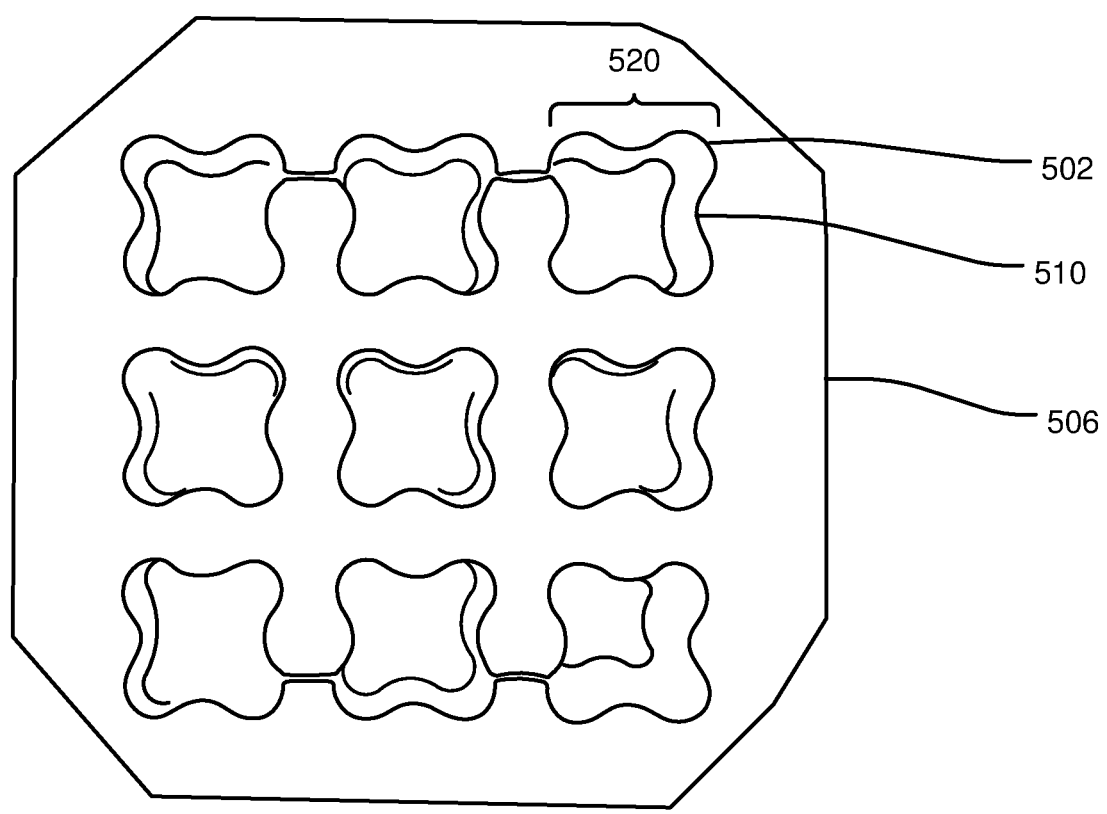
FIG. 5 illustrates a top view of the example cellular cushioning system in FIG. 4.
Figure 7:
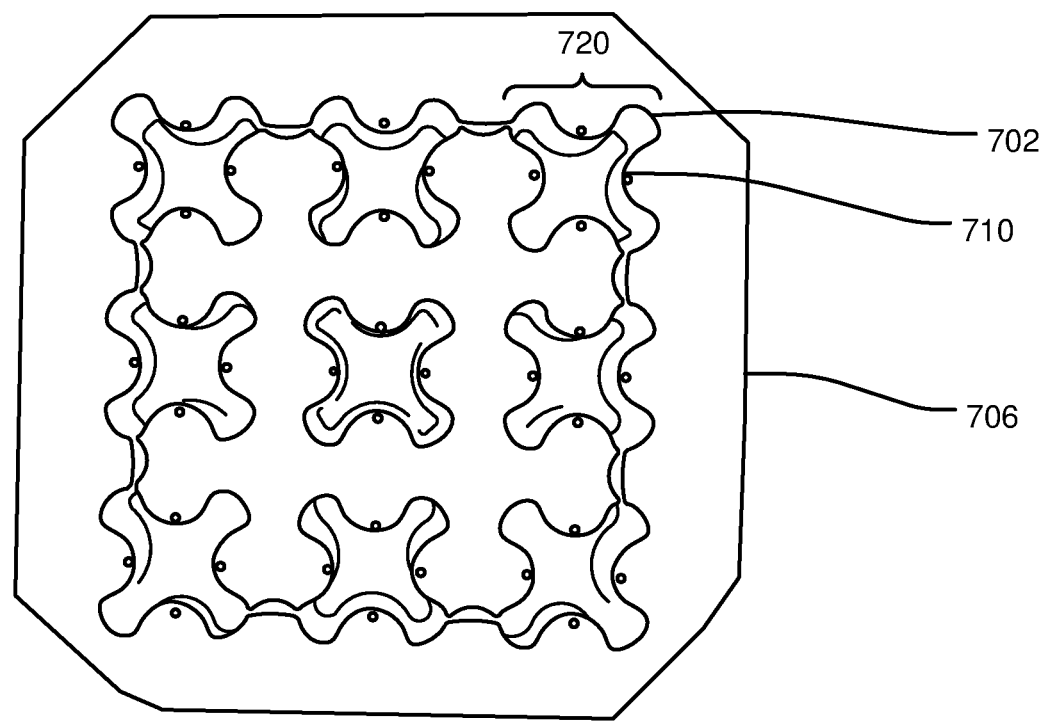
FIG. 7 illustrates a top view of the example cellular cushioning system in FIG. 6.
Figure 21:
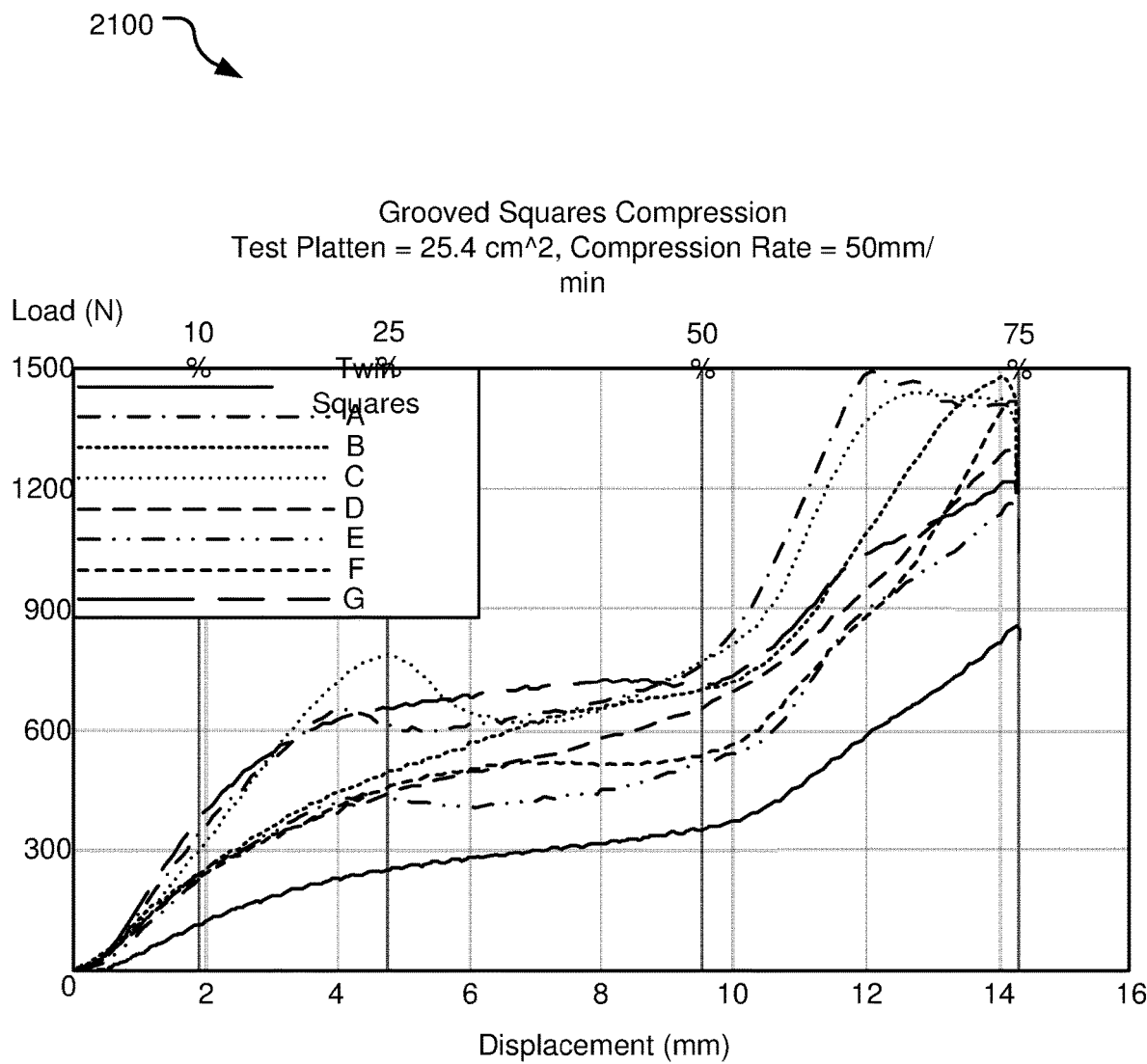
FIG. 21 shows a graph of force displacement of void cells in arrays of the described cushioning systems.

A circle 222 can be projected from each outwardly curved surface 210, each outwardly curved surface 210 having a characteristic radius 228 and a characteristic depth 224. Radius and depth of each outwardly curved surface may vary from the characteristic radius and depth (e.g. vary 20% or less, or less than both half a length and half a width of the rectangular overall outline). The size of the radii and the depths of the outwardly curved surface can vary in different implementations and in the same void cell. For instance, FIGS. 3, 5, and 7 show three void cells with the same geometry except for outward facing radius of different magnitude. Each void cell has the same number of outward facing radii per side. By varying the magnitude of the radii in each void cell, the structures deflect very differently, as shown in FIGS. 21 and 22 in Configurations A, D, and C, respectively.

The elastic modulus or stiffness in the void cells can be manipulated by varying the number, the depths, and the locations (e.g., vertical height) of the radii in the void cells. The outwardly curved surfaces prevent buckling and provide support for high impact by absorbing energy.

Figure 2B:
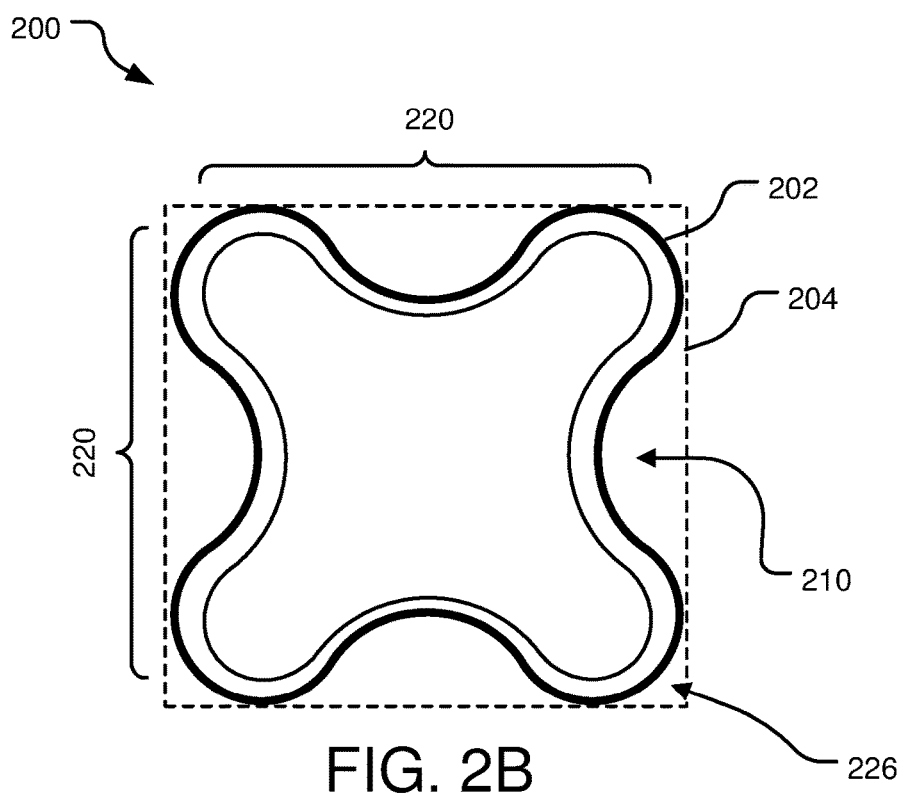
FIG. 2B illustrates a top view of an example base portion of a void cell in one array of the example cellular cushioning system.

FIG. 2B illustrates a top view of an example base portion of the void cell 200 in one array of the example cellular cushioning system. The void cell 200 is cube-shaped with four sidewalls 220 (as depicted with a rectangular overall outline 204 of the base portion of the void cell). The four sidewalls 220 each have one outwardly curved surface (outwardly curved surface 210) and two inwardly curved surfaces (inwardly curved surfaces 226). The outwardly curved surfaces 210 have curvatures that face away from the interior of the void cell 200. The inwardly curved surfaces 226 have curvatures that face toward the interior of the void cell 200.

The outwardly curved surfaces 210 dominate the overall design of the void cell 200. Specifically, the outwardly curved surfaces 210 constitute a substantial portion of the overall exterior surface area of each void cell 200. Specifically, the outwardly curved surfaces 210 substantially exceed a portion of the overall perimeter 202 (defined as greater than 25% of the overall perimeter 202 and depicted in a bold line) of the void cell 200. The perimeter 202 length substantially exceeds an overall outline 204 length of a base portion (not shown) of each molded void cell. The inwardly curved surfaces 226 substantially recess a portion of the overall perimeter (defined as less than 25% of the overall perimeter 202 and depicted in a dashed line) of the void cell 200.

FIG. 3 illustrates a top view of the example cellular cushioning system in FIG. 1. As shown, the cellular cushioning system 300 includes void cells (e.g., void cell 302) arranged in a first array 306 and a second array 308 (not shown). FIG. 3 shows the first array 306 has void cells (e.g., void cell 302), which comprise of four outwardly curved surfaces (e.g., outwardly curved surface 310) in each sidewall 320 of each void cell in the first array 306 in the cellular cushioning system 300.

Figure 4:
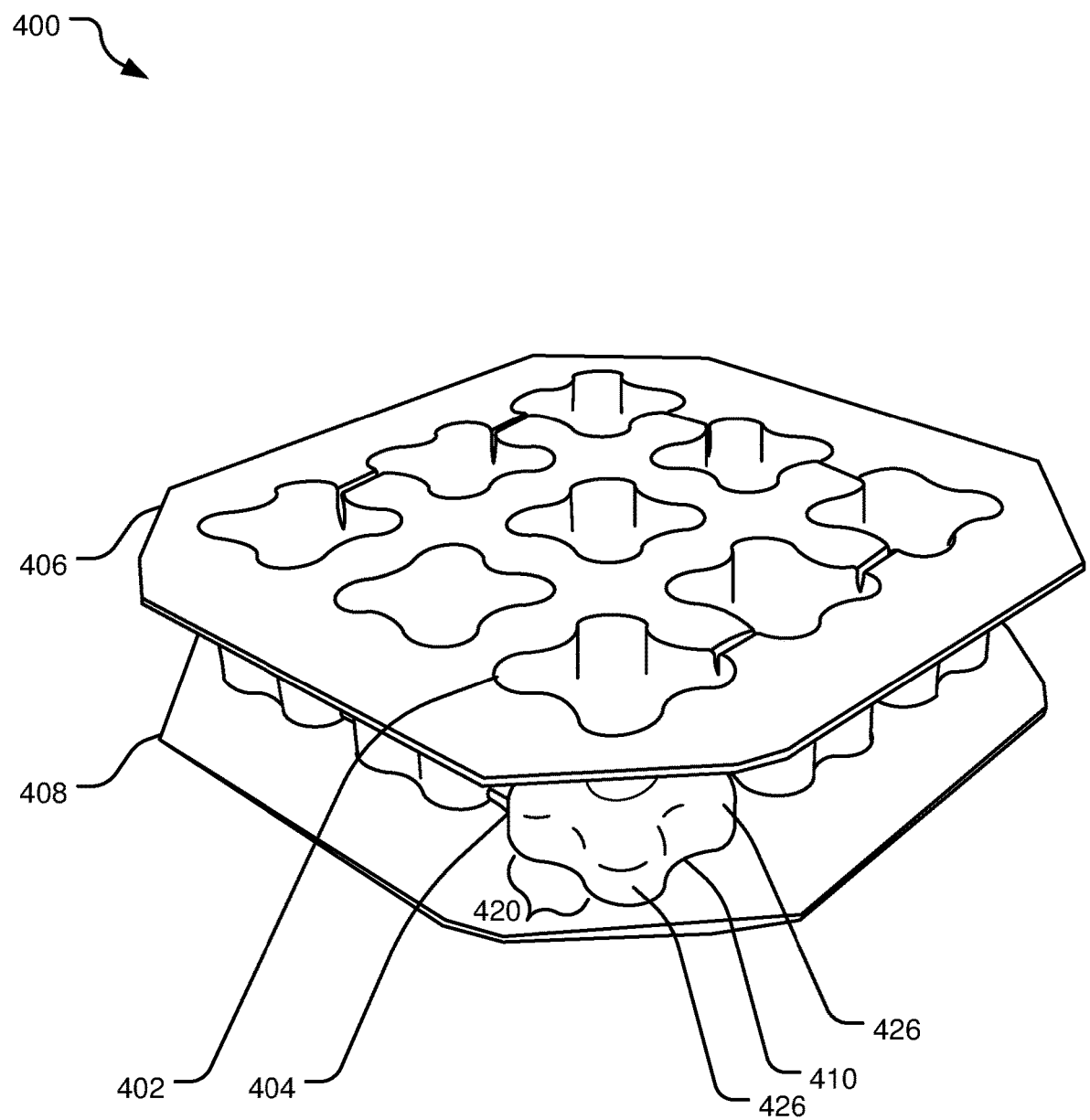
FIG. 4 illustrates a perspective view of an example cellular cushioning system in an unloaded state.

FIG. 4 illustrates a perspective view of an example cellular cushioning system 400 in an unloaded state. The cellular cushioning system 400 includes void cells (e.g., void cell 402 or void cell 404) arranged in two arrays. In other implementations, there can be one or more than two arrays of void cells.

The first array 406 and the second array 408 have void cells (e.g., void cell 404), which comprise of four outwardly curved surfaces (e.g., outwardly curved surface 410) in each sidewall (e.g., sidewall 420) of each void cell (e.g., void cell 404) in the first array 406 and the second array 408 in the cellular cushioning system 400. Each void cell (e.g., void cell 404) also comprise of four inwardly curved surfaces (e.g., inwardly curved surface 426), located on the corners of each void cell.

FIG. 5 illustrates a top view of the example cellular cushioning system in FIG. 4. As shown, the cellular cushioning system 500 includes void cells (e.g., void cell 502) arranged in a first array 506 and a second array 508 (not shown). FIG. 5 shows the first array 506 has void cells (e.g., void cell 502), which comprise of four outwardly curved surfaces (e.g., outwardly curved surface 510) in each sidewall 520 of each void cell in the first array 506 in the cellular cushioning system 500.

Figure 6:
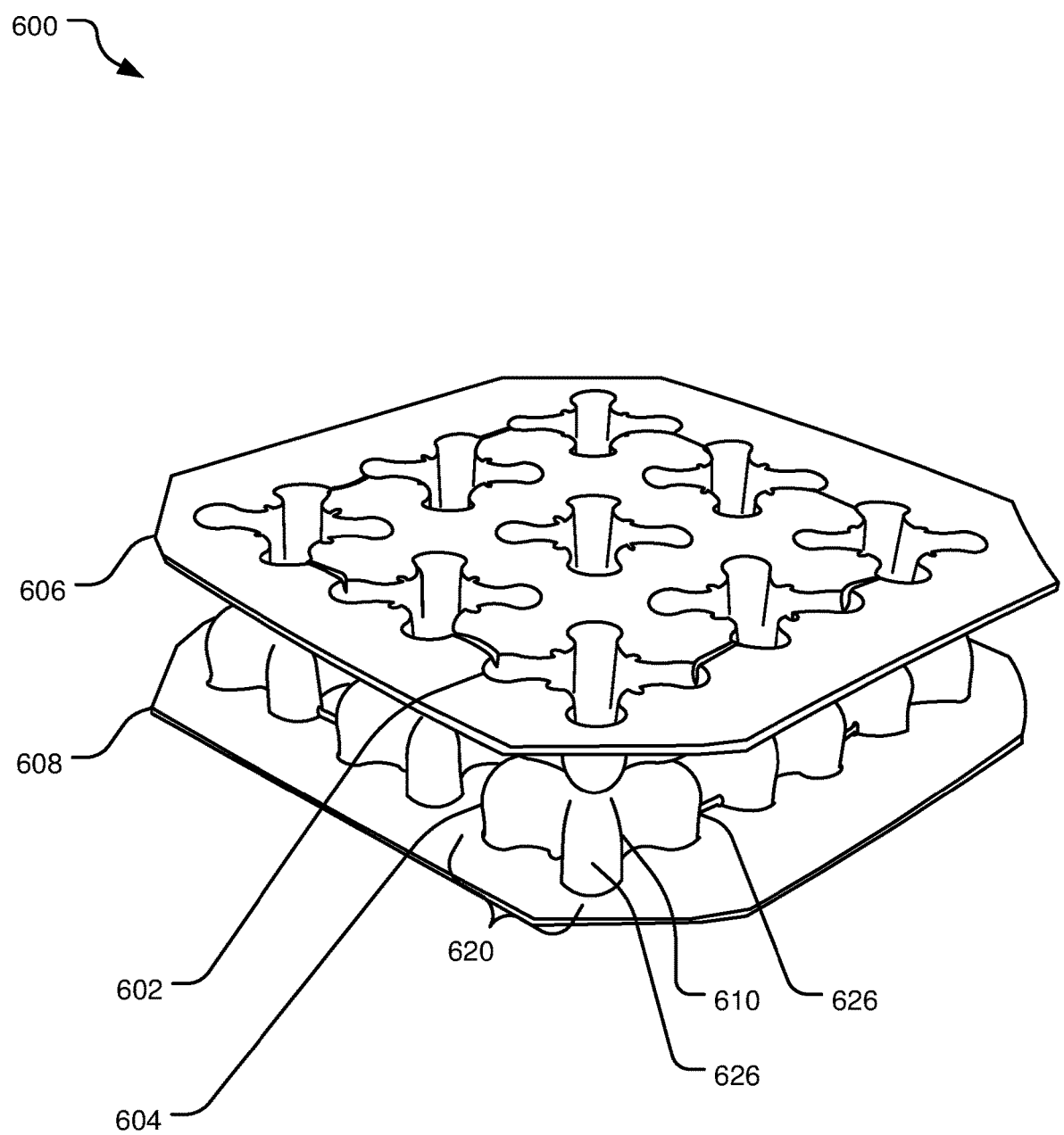
FIG. 6 illustrates a perspective view of an example cellular cushioning system in an unloaded state.

FIG. 6 illustrates a perspective view of an example cellular cushioning system 600 in an unloaded state. The cellular cushioning system 600 includes void cells (e.g., void cell 602 or void cell 604) arranged in two arrays. In other implementations, there can be one or more than two arrays of void cells.

The first array 606 and the second array 608 have void cells (e.g., void cell 604), which comprise of four outwardly curved surfaces (e.g., outwardly curved surface 610) in each sidewall (e.g., sidewall 620) of each void cell (e.g., void cell 604) in the first array 606 and the second array 608 in the cellular cushioning system 600. Each void cell (e.g., void cell 604) also comprise of four inwardly curved surfaces (e.g., outwardly curved surface 626), wherein two inwardly curved surfaces are each sidewall (e.g., sidewall 620) of each void cell.

FIG. 7 illustrates a top view of the example cellular cushioning system in FIG. 6. As shown, the cellular cushioning system 700 includes void cells (e.g., void cell 702) arranged in a first array 706 and a second array 708 (not shown). FIG. 7 shows the first array 706 has void cells (e.g., void cell 702), which comprise of four outwardly curved surfaces (e.g., outwardly curved surface 710) in each sidewall 720 of each void cell in the first array 706 in the cellular cushioning system 700.

Figure 8:
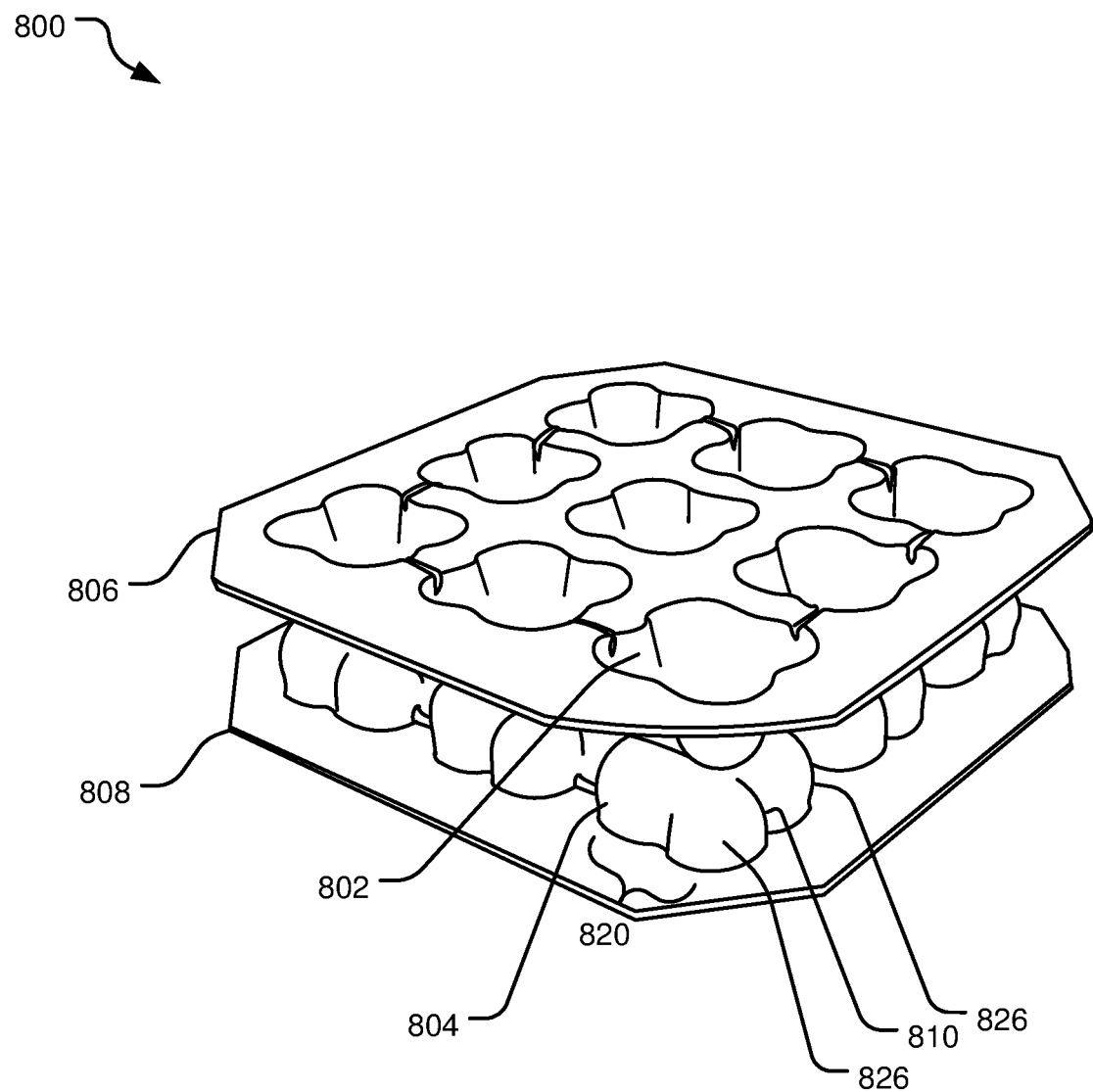
FIG. 8 illustrates a perspective view of an example cellular cushioning system in an unloaded state.

FIG. 8 illustrates a perspective view of an example cellular cushioning system 800 in an unloaded state. The cellular cushioning system 800 includes void cells (e.g., void cell 802 or void cell 804) arranged in two arrays. In other implementations, there can be one or more than two arrays of void cells.

The first array 806 and the second array 808 have void cells (e.g., void cell 804), which comprise of four outwardly curved surfaces (e.g., outwardly curved surface 810) in each sidewall (e.g., sidewall 820) of each void cell (e.g., void cell 804) in the first array 806 and the second array 808 in the cellular cushioning system 800. Each void cell (e.g., void cell 804) also comprise of four inwardly curved surfaces (e.g., inwardly curved surface 826), wherein two inwardly curved surfaces are each sidewall (e.g., sidewall 820) of each void cell.

Figure 9:
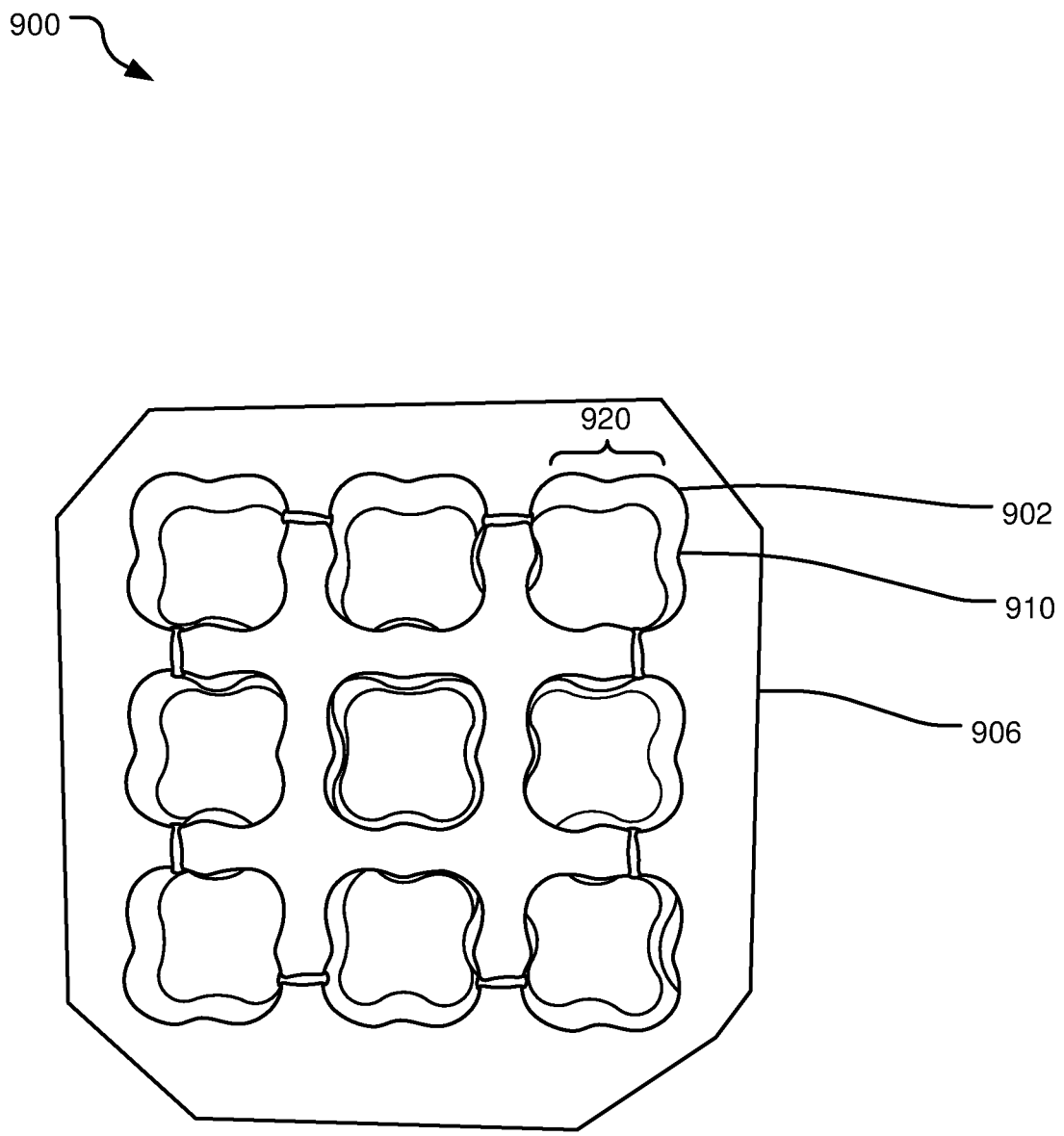
FIG. 9 illustrates a top view of the example cellular cushioning system in FIG. 8.

FIG. 9 illustrates a top view of the example cellular cushioning system in FIG. 8. As shown, the cellular cushioning system 900 includes void cells (e.g., void cell 902) arranged in a first array 906 and a second array 908 (not shown). FIG. 9 shows the first array 906 has void cells (e.g., void cell 902), which comprise of four outwardly curved surfaces (e.g., curvature 910) in each sidewall 920 of each void cell in the first array 906 in the cellular cushioning system 900.

Figure 10:
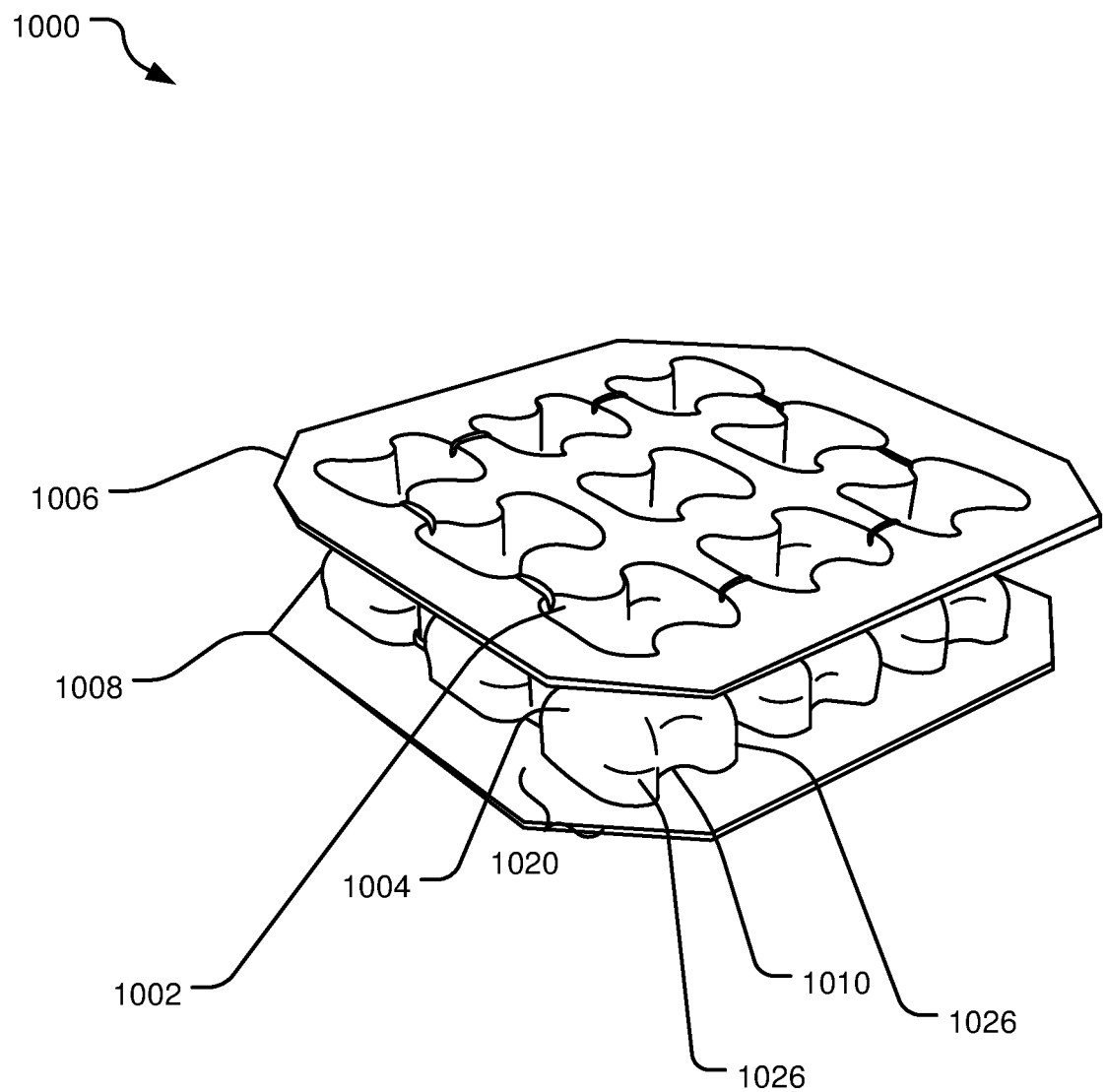
FIG. 10 illustrates a perspective view of an example cellular cushioning system in an unloaded state.

FIG. 10 illustrates a perspective view of an example cellular cushioning system 1000 in an unloaded state. The cellular cushioning system 1000 includes void cells (e.g., void cell 1002 or void cell 1004) arranged in two arrays. In other implementations, there can be one or more than two arrays of void cells.

The first array 1006 and the second array 1008 have void cells (e.g., void cell 1004), which comprise of two outwardly curved surfaces (e.g., curvature 1010) on two opposing sidewalls (e.g., sidewall 1020) of each void cell (e.g., void cell 1004) in the first array 1006 and the second array 1008 in the cellular cushioning system 1000. Each void cell (e.g., void cell 1004) also comprise of four inwardly curved surfaces (e.g., curvature 1026), where the two inwardly curved surfaces are on two opposing each sidewall (e.g., sidewall 1020) of each void cell.

Figure 11:
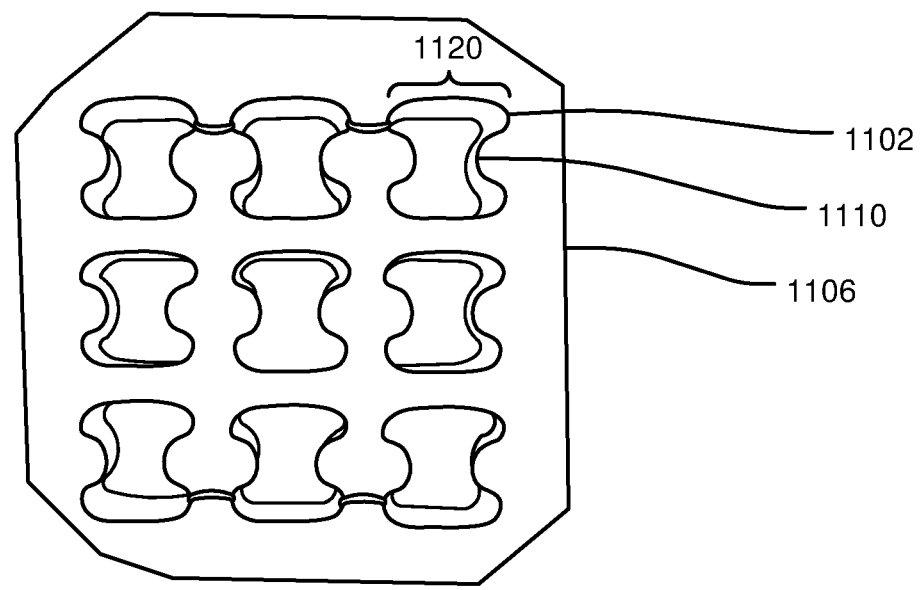
FIG. 11 illustrates a top view of the example cellular cushioning system in FIG. 10.

FIG. 11 illustrates a top view of the example cellular cushioning system in FIG. 10. As shown, the cellular cushioning system 1100 includes void cells (e.g., void cell 1102) arranged in a first array 1106 and a second array 1108 (not shown). FIG. 11 shows the first array 1106 has void cells (e.g., void cell 1102), which comprise of four outwardly curved surfaces (e.g., curvature 1110) in each sidewall 1120 of each void cell in the first array 1106 in the cellular cushioning system 1100.

Figure 12:
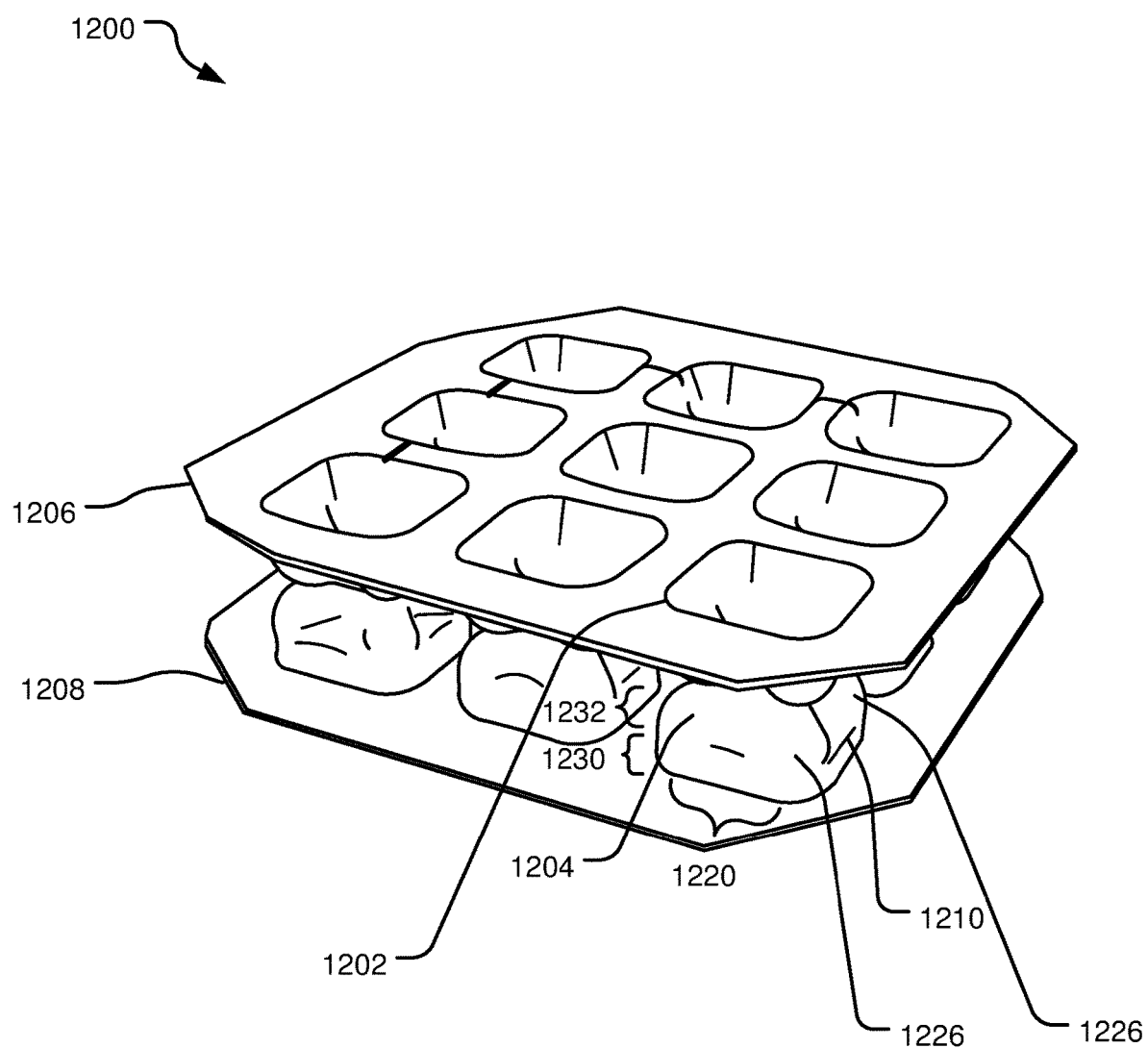
FIG. 12 illustrates a perspective view of an example cellular cushioning system in an unloaded state.

FIG. 12 illustrates a perspective view of an example cellular cushioning system 1200 in an unloaded state. The cellular cushioning system 1200 includes void cells (e.g., void cell 1202 or void cell 1204) arranged in two arrays. In other implementations, there can be one or more than two arrays of void cells.

The first array 1206 and the second array 1208 have void cells (e.g., void cell 1204), which comprise of four outwardly curved surfaces (e.g., curvature 1210) in each sidewall (e.g., sidewall 1220) of a peak portion 1232 of each void cell (e.g., void cell 1204) in the first array 1206 and the second array 1208 in the cellular cushioning system 1200. The sidewalls 1220 in the peak portions 1232 of each void cell (e.g., void cell 1204) also comprise of four inwardly curved surfaces (e.g., inwardly curved surfaces 1226). A base portion 1230 of each void cell 1204 includes only the inwardly curved surfaces 1226.

Figure 13:
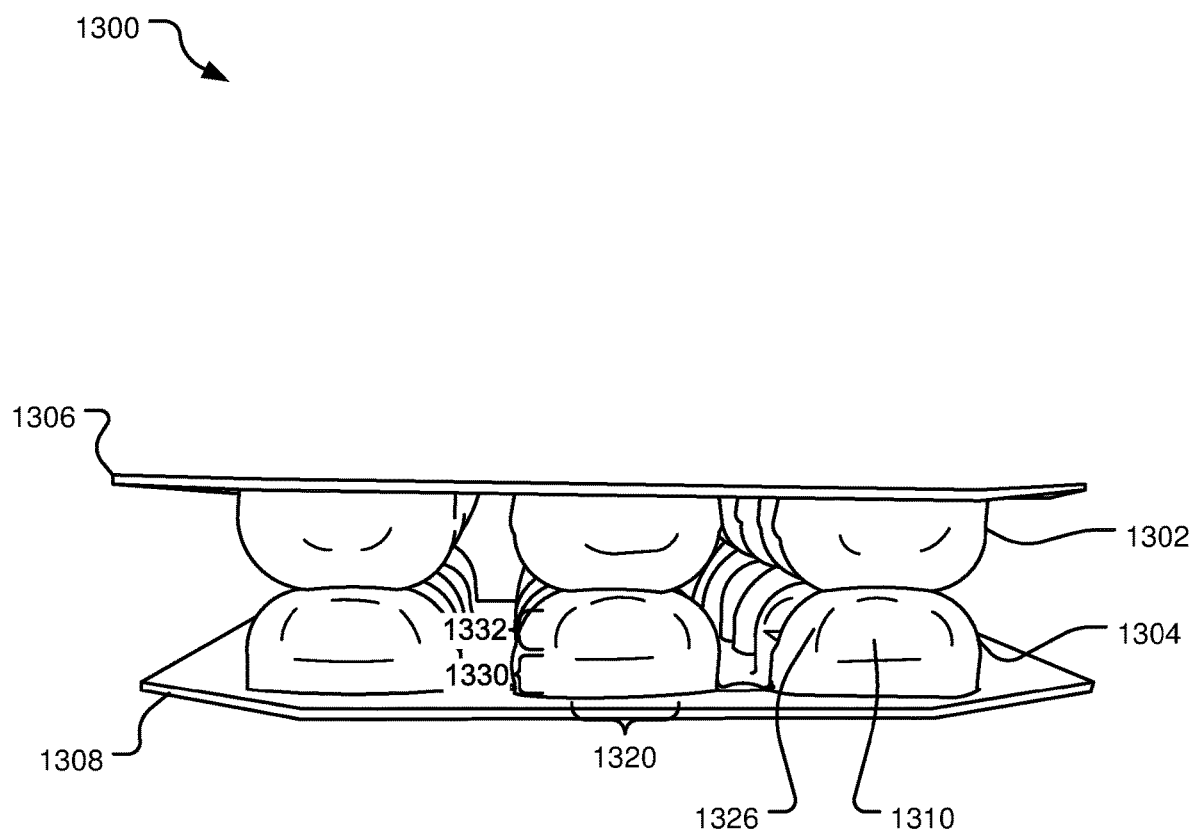
FIG. 13 illustrates an elevation view of the example cellular cushioning system in FIG. 12.

FIG. 13 illustrates an elevation view of the example cellular cushioning system in FIG. 1. The cellular cushioning system 1300 includes void cells (e.g., void cell 1302 or void cell 1304) arranged in a first array 1306 and a second array 1308.

The first array 1306 and the second array 1308 have void cells (e.g., void cell 1304), which comprise of four outwardly curved surfaces (e.g., curvature 1310) in each sidewall (e.g., sidewall 1320) of a peak portion 1332 of each void cell (e.g., void cell 1304) in the first array 1306 and the second array 1308 in the cellular cushioning system 1300. The sidewalls 1320 in the peak portions 1332 of each void cell (e.g., void cell 1304) also comprise of four inwardly curved surfaces (e.g., inwardly curved surfaces 1326). A base portion 1330 of each void cell 1304 includes only the inwardly curved surfaces 1326.

Figure 14:
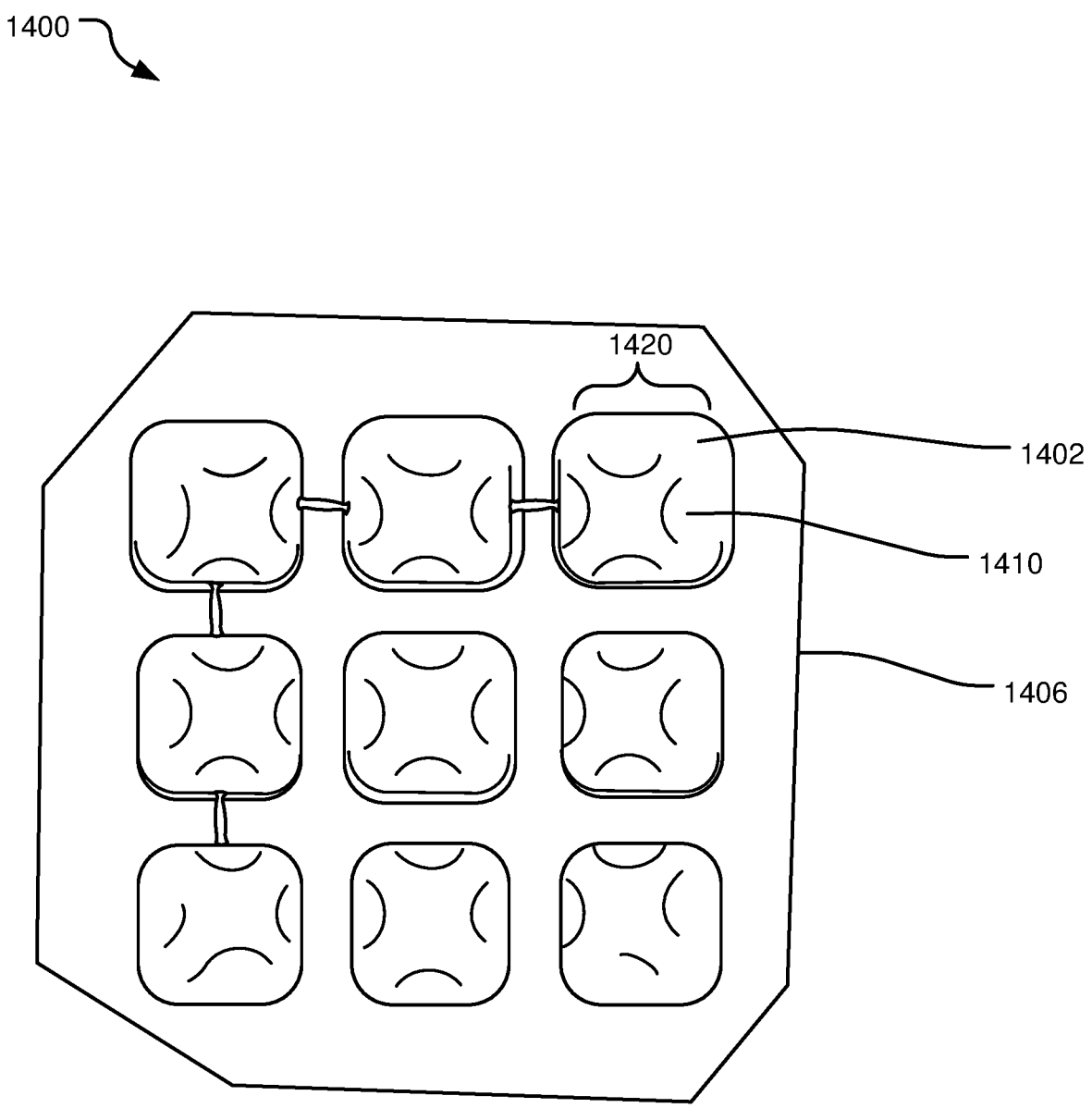
FIG. 14 illustrates a top view of the example cellular cushioning system in FIG. 12.

FIG. 14 illustrates a top view of the example cellular cushioning system in FIG. 12. As shown, the cellular cushioning system 1400 includes void cells (e.g., void cell 1402) arranged in a first array 1406 and a second array (not shown). FIG. 14 shows the first array 1406 has void cells (e.g., void cell 1402), which comprise of four outwardly curved surfaces (e.g., curvature 1410) in each sidewall 1420 of each void cell in the first array 1406 in the cellular cushioning system 1400.

FIG. 15 illustrates a perspective view of an example cellular cushioning system 1500 in an unloaded state. The cellular cushioning system 1500 includes void cells (e.g., void cell 1502 or void cell 1504) arranged in two arrays. In other implementations, there can be one or more than two arrays of void cells.

In FIG. 15, the first array 1506 and the second array 1508 have void cells (e.g., void cell 1504), which comprise of four outwardly curved surfaces (e.g., curvature 1510) in each sidewall (e.g., sidewall 1520) of a peak portion 1532 of each void cell (e.g., void cell 1504) in the first array 1506 and the second array 1508 in the cellular cushioning system 1500. The sidewalls 1520 in the peak portions 1532 of each void cell (e.g., void cell 1504) also comprise of four inwardly curved surfaces (e.g., inwardly curved surfaces 1526). A base portion 1530 of each void cell 1504 includes only the inwardly curved surfaces 1526.

Figure 16:
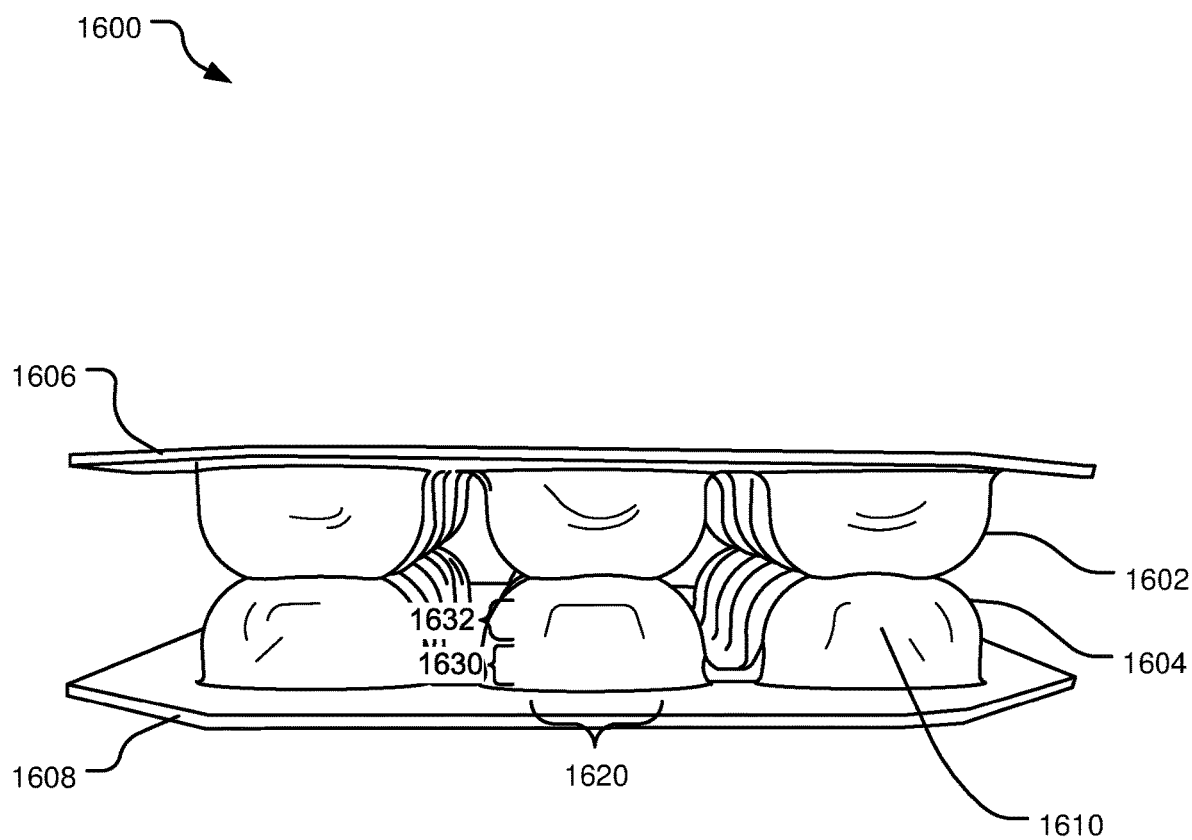
FIG. 16 illustrates an elevation view of the example cellular cushioning system in FIG. 15.

FIG. 16 illustrates an elevation view of the example cellular cushioning system in FIG. 1. The cellular cushioning system 1600 includes void cells (e.g., void cell 1602 or void cell 1604) arranged in a first array 1606 and a second array 1608.

The first array 1606 and the second array 1608 have void cells (e.g., void cell 1604), which comprise of four outwardly curved surfaces (e.g., curvature 1610) in each sidewall (e.g., sidewall 1620) of a peak portion 1632 of each void cell (e.g., void cell 1604) in the first array 1606 and the second array 1608 in the cellular cushioning system 1600. The sidewalls 1620 in the peak portions 1632 of each void cell (e.g., void cell 1604) also comprise of four inwardly curved surfaces (e.g., inwardly curved surfaces 1626). A base portion 1630 of each void cell 1604 includes only the inwardly curved surfaces 1626.

Figure 17:
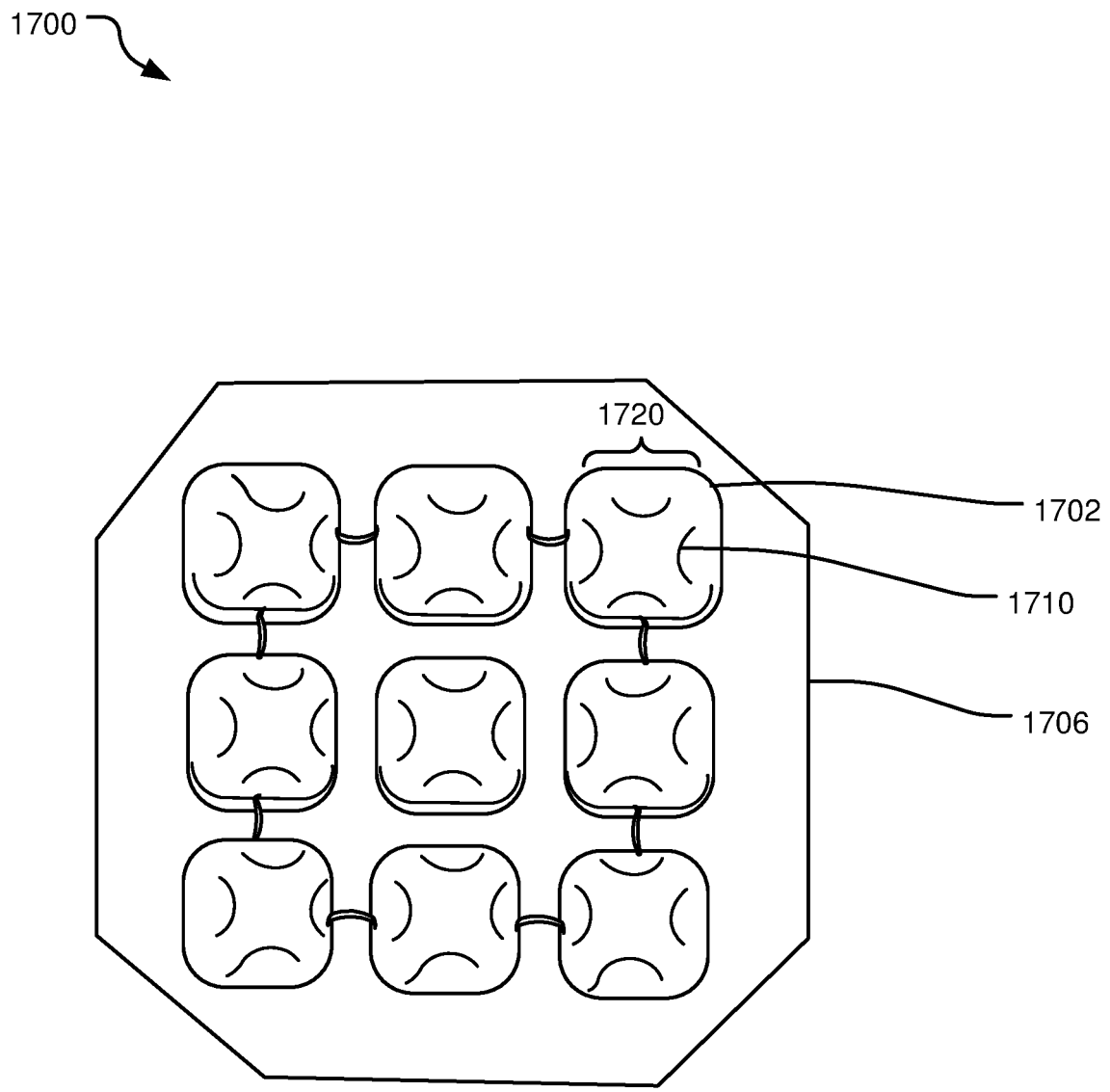
FIG. 17 illustrates a top view of the example cellular cushioning system in FIG. 15.

FIG. 17 illustrates a top view of the example cellular cushioning system in FIG. 15. As shown, the cellular cushioning system 1700 includes void cells (e.g., void cell 1702) arranged in a first array 1706 and a second array (not shown). FIG. 17 shows the first array 1706 has void cells (e.g., void cell 1702), which comprise of four outwardly curved surfaces (e.g., curvature 1710) in each sidewall 1720 of each void cell in the first array 1706 in the cellular cushioning system 1700.

FIG. 18 illustrates a perspective view of an example cellular cushioning system 1800 in an unloaded state. The cellular cushioning system 1800 includes void cells (e.g., void cell 1802 or void cell 1804) arranged in two arrays. In other implementations, there can be one or more than two arrays of void cells. The arrays can be flat or curved.

The first array 1806 and the second array 1808 have void cells (e.g., void cell 1804), which comprise of four outwardly curved surfaces (e.g., curvature 1810) in each sidewall (e.g., sidewall 1820) of a peak portion 1832 of each void cell (e.g., void cell 1804) in the first array 1806 and the second array 1808 in the cellular cushioning system 1800. The sidewalls 1820 in the peak portions 1832 of each void cell (e.g., void cell 1804) also comprise of four inwardly curved surfaces (e.g., inwardly curved surfaces 1826). A base portion 1830 of each void cell 1804 includes only the inwardly curved surfaces 1826.

Figure 19:
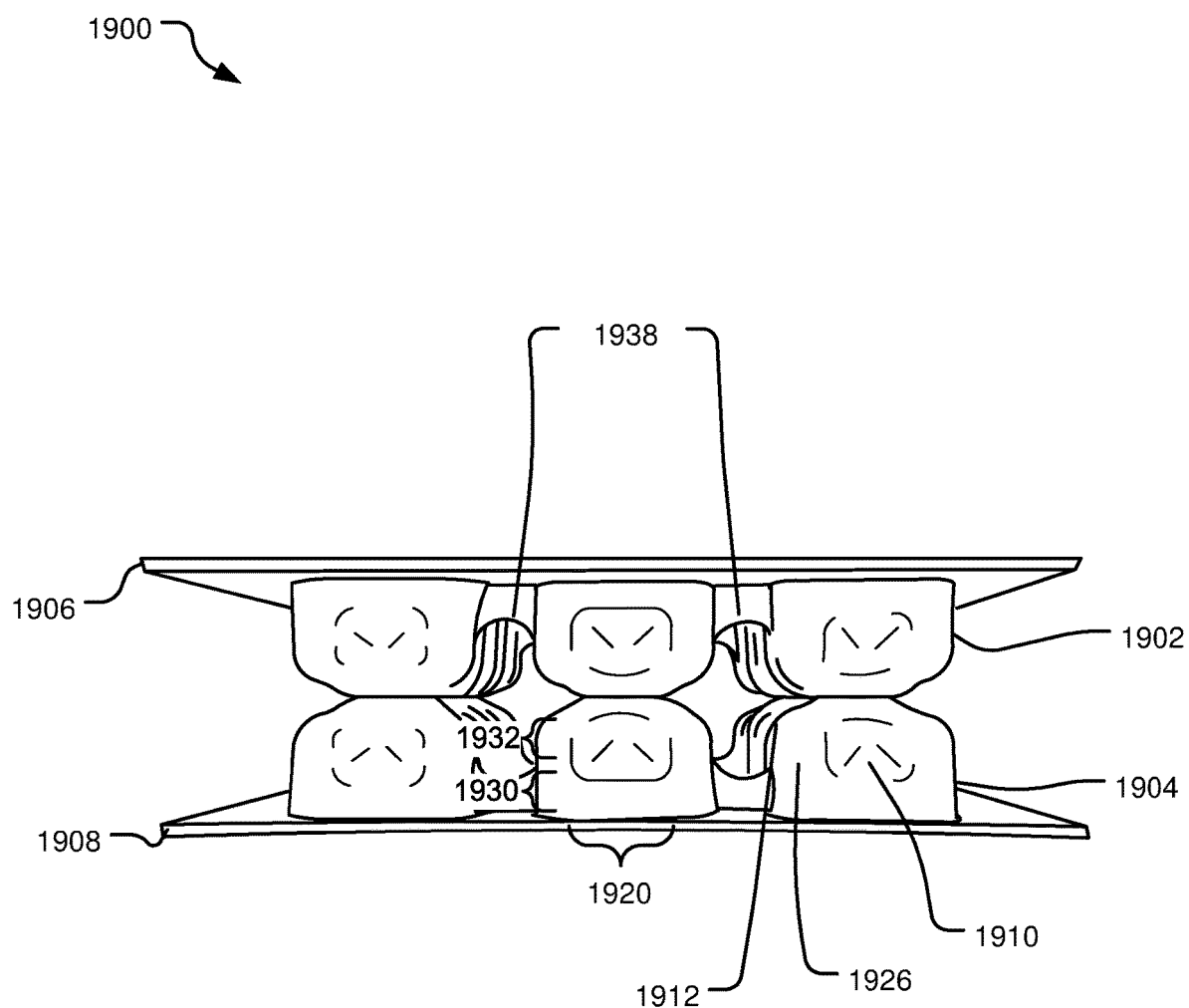
FIG. 19 illustrates an elevation view of the example cellular cushioning system in FIG. 18.
Figure 20:
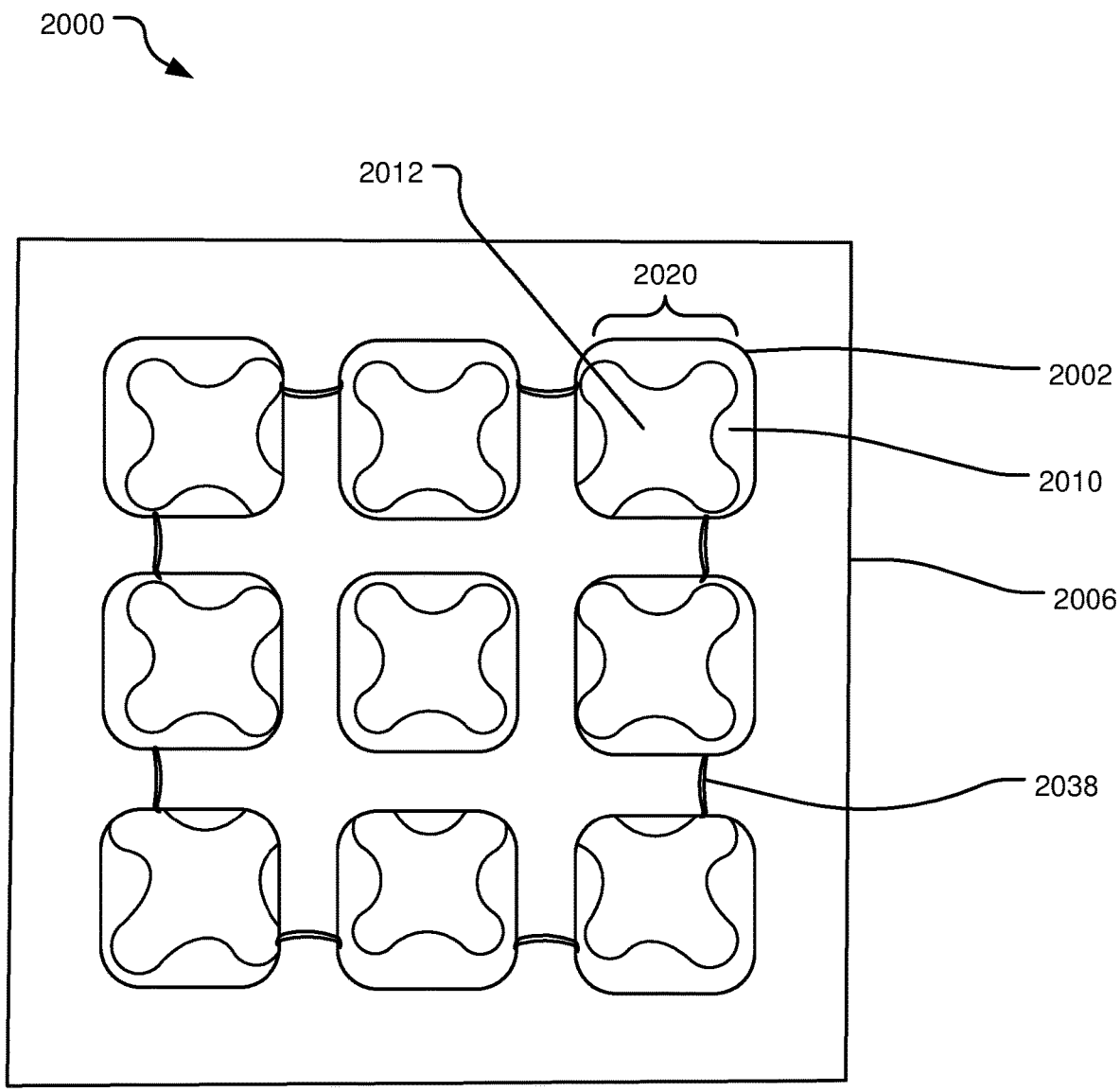
FIG. 20 illustrates a top view of the example cellular cushioning system in FIG. 18.

An array can include significant ribs (e.g., rib 1830) that separate the void cells (e.g., void cells 1804 and 1816). The ribs 1830 can be located in the first array 1806 and/or or the second array 1808, and located in a variety of configurations between the void cells. For example, the ribs 1830, 1930, and 2030 in FIGS. 18-20 are located only between the exterior void cells in the first array 1806 and the second array 1808. In another implementation the ribs 1830 may be located between all the void cells or only between certain selected void cells, such as between the void cells on the corners of an array. The number of void cells and the number of ribs can vary depending on the implementation. The positioning of the ribs in relation to the void cells can vary. In some implementations, the ribs can be a thin structure attached to a small contact point on the void cells, or the ribs may be a wider structure that is attached to a larger contact point on the void cells. The ribs can be located at the top or the bottom of the void cells. The ribs can be located near the end of the void cells, for example, close to the exterior of the array, or close to the interior of the void cells. Or, in another implementation, the ribs can be located near the center of the void cells.

The ribs provide a stiffening function to the array during compression. The material, wall thickness, cell size, and/or cell spacing of the cells within the cellular cushioning system 1800 may be optimized to minimize generation of mechanical noise by compression (e.g., buckling of the sidewalls) of the void cells. For example, properties of the cells may be optimized to provide a smooth relationship between displacement and an applied force. Further, a light lubricating coating (e.g., talcum powder or oil) may be used on the exterior of the void cells to reduce or eliminate noise generated by void cells contacting and moving relative to one another. Reduction or elimination of mechanical noise may make use of the cellular cushioning system 1800 more pleasurable to the user.

FIG. 19 illustrates an elevation view of the example cellular cushioning system in FIG. 1. The cellular cushioning system 1900 includes void cells (e.g., void cell 1902 or void cell 1904) arranged in a first array 1906 and a second array 1908.

The first array 1906 and the second array 1908 have void cells (e.g., void cell 1904), which comprise of four outwardly curved surfaces (e.g., curvature 1910) in each sidewall (e.g., sidewall 1920) of a peak portion 1932 of each void cell (e.g., void cell 1904) in the first array 1906 and the second array 1908 in the cellular cushioning system 1900. The sidewalls 1920 in the peak portions 1932 of each void cell (e.g., void cell 1904) also comprise of four inwardly curved surfaces (e.g., inwardly curved surfaces 1926). A base portion 1930 of each void cell 1904 includes only the inwardly curved surfaces 1926.

The first array 1906 and the second array 1908 include significant ribs (e.g., rib 1930) that separate the void cells and provide stiffening to the matrices during compression. The ribs 1930 can be located in the first array 1906 and/or or the second array 1908, and located in a variety of configurations between the void cells. For example, the ribs 1830, 1930, and 2030 in FIGS. 18-20 are located only between the exterior void cells in the first array 1906 and the second array 1908. In another implementation the ribs 1930 may be located between all the void cells or only between certain selected void cells, such as between the void cells on the corners of an array. The number of void cells and the number of ribs can vary depending on the implementation. The positioning of the ribs in relation to the void cells can vary. In some implementations, the ribs can be a thin structure attached to a small contact point on the void cells, or the ribs may be a wider structure that is attached to a larger contact point on the void cells. The ribs can be located at the top or the bottom of the void cells. The ribs can be located near the end of the void cells, for example, close to the exterior of the array, or close to the interior of the void cells. Or, in another implementation, the ribs can be located near the center of the void cells.

Different numbers and patterns of outwardly curved surfaces (e.g., curvature 1910) can be molded into the void cells (e.g., void cell 1904) in an array. In some implementations, a cubic shape of a void cell (e.g., void cell 1902) may adopt the slope of its cubic shape of an adjacent or adjoined void cell (e.g., void cell 1904). In the cellular cushioning system 1900, the peak portion (e.g., peak portion 1912) of the void cell (e.g., void cell 1904) can be significantly rounded or segmented as a result of a larger radius or of a deeper depth of each curvature (e.g., curvature 1910), or by the number of curvatures present in each void cell. A larger radius may be approximately 20 mm. In another example, a larger radius may be half the length of the void cell less 1 mm. (The radii and depths of the curvatures are described in detail in FIG. 2.)

In other implementations, the peak portion of a void cell can be less rounded or segmented as a result of a smaller radius or of a shallower depth of each curvature, or by the number of curvatures present in each void cell (see, for example, the less rounded and segmented peak portion of the void cells with the smaller radius of curvatures and smaller number of curvatures in FIGS. 4, 8 and 9). A smaller radius may be approximately 1 mm. In FIG. 19, the peak portions are dome-shaped, and in a loaded condition the peak portions compress.

FIG. 20 illustrates a top view of the example cellular cushioning system in FIG. 1. As shown, the cellular cushioning system 2000 includes void cells (e.g., void cell 2002) arranged in a first array 2006 and a second array 2008 (not shown). The first array 2006 has void cells (e.g., void cell 2002), which comprise of four outwardly curved surfaces (e.g., curvature 2010) located in each sidewall 2020 of each void cell in the first array 2006 in the cellular cushioning system 2000.

The first array 2006 and the second array 2008 include significant ribs (e.g., rib 2030) that separate the void cells and provide stiffening to the matrices during compression. The ribs 2030 can be located in the first array 2006 and/or or the second array 2008, and located in a variety of configurations between the void cells. For example, the ribs 1830, 1930, and 2030 in FIGS. 18-20 are located only between the exterior void cells in the first array 2006 and the second array 2008. In another implementation the ribs 2030 may be located between all the void cells or only between certain selected void cells, such as between the void cells on the corners of an array. The number of void cells and the number of ribs can vary depending on the implementation. The positioning of the ribs in relation to the void cells can vary. In some implementations, the ribs can be a thin structure attached to a small contact point on the void cells, or the ribs may be a wider structure that is attached to a larger contact point on the void cells. The ribs can be located at the top or the bottom of the void cells. The ribs can be located near the end of the void cells, for example, close to the exterior of the array, or close to the interior of the void cells. Or, in another implementation, the ribs can be located near the center of the void cells.

Different numbers and patterns of outwardly curved surfaces (e.g., curvature 2010) can be molded into the void cells (e.g., void cell 2002) in an array. In some implementations, a cubic shape of a void cell (e.g., void cell 2002) may adopt the slope of its cubic shape of an adjacent or adjoined void cell (not shown). In the cellular cushioning system 2000, the peak portion (e.g., peak portion 2012) of the void cell (e.g., void cell 2002) can be significantly rounded or segmented as a result of a larger radius or of a deeper depth of each curvature (e.g., curvature 2010), or by the number of curvatures present in each void cell. A larger radius may be approximately 20 mm. In another example, a larger radius may be half the length of the void cell less 1 mm. (The Radii and depths of the curvatures are described in detail in FIG. 2.)

In other implementations, the peak portion of a void cell can be less rounded or segmented as a result of a smaller radius or of a shallower depth of each curvature, or by the number of curvatures present in each void cell (see, for example, the less rounded and segmented peak portion of the void cells with the smaller radius of curvatures and smaller number of curvatures in FIGS. 4, 8 and 9). A smaller radius may be approximately 1 mm. In FIG. 20, the peak portions are dome-shaped, and in a loaded condition the peak portions compress.

FIG. 21 shows a graph 2100 of force displacement of void cells in an array of the described cushioning system. The lines on the graph show force displacement curves based on Displacement (mm)×Load (N). The "Twin Squares" line correlates to an array of void cells with no outwardly curved surfaces. The lines A-G correlate to the void cells in the arrays as follows:

Line A correlates to FIGS. 1 and 3
Line B correlates to FIGS. 4 and 5
Line C correlates to FIGS. 6 and 7

Line D correlates to FIGS. 8 and 9
Line E correlates to FIGS. 10 and 11
Line F correlates to FIGS. 12, 13, and 14
Line G correlates to FIGS. 15, 16, and 17

As shown in the graph, it takes a different amount of force to obtain the same amount of displacement depending on the presences and configuration of outwardly curved surfaces in the sides of the void cells. For example, lines B and D, which both represent configurations comprising four outwardly curved surfaces in the sides of each void cell almost trace each other in force displacement, and then diverge between 11 and 12 mm displacement. As Radii are introduced into the void cells, splits are visible on the graph of two lines, which were almost the same. Line C shows a configuration with an easy compression, then shows a higher elastic modulus as displacement increases. Line B has the same slope as line C but progresses to show the higher elastic modulus of the void cells of the configuration represented. Compared to that, line G has relatively even compression (similar to foam), and then stiffens up. Forming the Radii in the curvatures of the void cell results in a 40% reduction of impact and compression.

FIG. 22 shows a table 2200 of load force based on 10%, 25%, 50%, and 75% compression for the void cells in arrays of the described cushioning systems. The "TS" (twin squares) configuration data correlates to an array of void cells with no outwardly curved surfaces. The configurations A-G correlate to the void cells in the arrays as follows:

Configuration A correlates to FIGS. 1 and 3
Configuration B correlates to FIGS. 4 and 5
Configuration C correlates to FIGS. 6 and 7
Configuration D correlates to FIGS. 8 and 9
Configuration E correlates to FIGS. 10 and 11
Configuration F correlates to FIGS. 12, 13, and 14
Configuration G correlates to FIGS. 15, 16, and 17

The data in the table 2200 shows an increase in load force (N) results in greater measurements of compression. For example, a load force of 1214 N for Configuration G, results in 75% compression, whereas a load force of only 376 N results in only 10% compression for Configuration G.

The array configuration with only two outwardly curved surfaces in each void cell (Configuration E) requires a lower load force N (see load force of 1168N for 75% compression) as compared to configurations with four outwardly curved surfaces in each void cell (Configurations A-D and F-G), which require load forces of 1214N and above for 75% compression. The array configuration with no outwardly curved surfaces in each void cell (Configuration TS) requires an even lower load force N of 855N for 75% compression as compared to the configuration with two outwardly curved surfaces in each void cell (Configuration E).

Photographs of the void cells measured and depicted in the graph shown in FIG. 21 and the table in FIG. 22 are attached in an Appendix. The Appendix includes photographs for Configurations TS and A-G (described in FIGS. 21 and 22) at 10% compression, 25% compression, 50% compression, 75% compression, a side unloaded view, a side view, and a top view.

Figure 23:
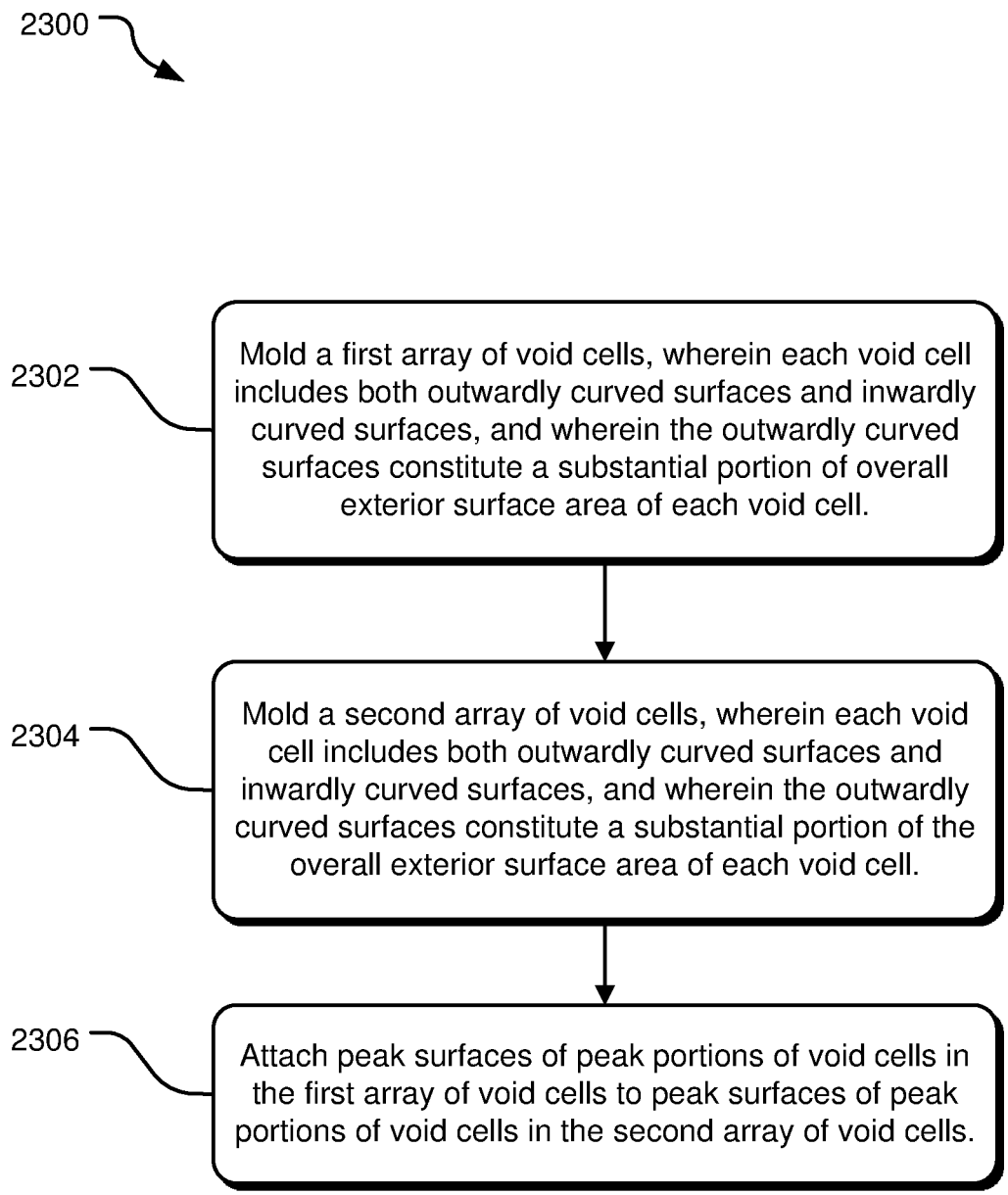
FIG. 23 illustrates example operations of manufacturing an example cellular cushioning system.

FIG. 23 illustrates example operations 2300 for manufacturing a cellular cushioning system. The cellular cushioning system may be molded, or in other implementations manufactured using a variety of manufacturing processes (e.g., blow molding, thermoforming, extrusion, injection molding, laminating, etc.). The cushioning system can comprise of one or more arrays of void cells. The arrays can be flat (planar) or curved (non-planar).

A first molding operation 2302 molds a first array of void cells. The void cells in the first array include both outwardly curved surfaces and inwardly curved surfaces. Each curvature of the outwardly curved surfaces can be configured in a sidewall of a void cell. Each curvature of the inwardly curved surfaces can be configured on a corner of a void cell. However, in other implementations, the outwardly curved surfaces can be configured on a corner of a void cell and the inwardly curved surfaces can be configured in a sidewall of a void cell. Other configurations are contemplated. The outwardly curved surfaces constitute a substantial portion of the overall exterior surface area of each void cell.

A second molding operation 2304 molds a second array of void cells. The void cells in the first array include both outwardly curved surfaces and inwardly curved surfaces. Each curvature of the outwardly curved surfaces can be configured in a sidewall of a void cell. Each curvature of the inwardly curved surfaces can be configured on a corner of a void cell. The outwardly curved surfaces constitute a substantial portion of the overall exterior surface area of each void cell.

The void cells are hollow chambers that resist deflection due to compressive forces, similar to compression springs. At least the material, wall thickness, size, and shape of each of the void cells define the resistive force each of the void cells can apply. Materials used for the void cells are generally elastically deformable under expected load conditions and will withstand numerous deformations without fracturing or suffering other breakdown impairing the function of the cellular cushioning system. Example materials include thermoplastic urethane, thermoplastic elastomers, styrenic co-polymers, rubber, ethyl acetate, Dow Pellethane®, Lubrizol Estane®, Dupont™ Hytrel®, ATOFINA Pebax®, and Krayton polymers. Further, the wall thickness may range from 5 mil to 80 mil. Still further, the size of each of the void cells may range from 5 mm to 70 mm sides in a cubical implementation. Further yet, the void cells may be cubical, pyramidal, hemispherical, or any other shape with external facing curvature capable of having a hollow interior volume. Other shapes may have similar dimensions as the aforementioned cubical implementation. Still further, the void cells may be spaced a variety of distances from one another. An example spacing range is 2.5 mm to 150 mm.

In one implementation, the base portion of the void cells can be square or rectangular, with a trapezoidal volume and a rounded top. That void cell geometry may provide a smooth compression profile of the system and minimal bunching of the individual void cells. Bunching occurs particularly on corners and vertical sidewalls of the void cells where the material buckles in such a way as to create multiple folds of material that can cause pressure points and a less uniform feel to the cellular cushioning system overall.

An attaching operation 2306 attaches the first array of void cells and the second array of void cells together. The first array of void cells and the second array of void cells can be laminated, glued, or otherwise attached together at the peak surfaces of the peak portion of the void cells in the first array and the second array. Due to varying configurations with a different number of void cells in the two arrays, the attachment of the void cells to each other may occur at different points of contact on each void cell.

The above specification, examples, and data provide a complete description of the structure and use of exemplary embodiments of the invention. Since many embodiments of the invention can be made without departing from the spirit and scope of the invention, the invention resides in the claims hereinafter appended. Furthermore, structural fea-

What is claimed is:

1. A cushioning structure comprising:
a first array of spaced apart elastically deformable void cells, wherein some of the void cells include four sidewalls forming a rectangular outline, at least two of the sidewalls each including only one uninterrupted outwardly curved surface and at least two uninterrupted inwardly curved surfaces, and wherein the outwardly curved surfaces constitute at least 20% of the overall exterior surface area of each void cell, wherein the cushioning structure is elastically deformable over at least 10% of its stroke, wherein each of the void cells are open to atmosphere.

2. The cushioning structure of claim 1, further comprising:
a second array of elastically deformable void cells, wherein peak surfaces of peak portions of void cells in the second array of void cells are attached to peak surfaces of peak portions of void cells in the first array.

3. The cushioning structure of claim 1, wherein a perimeter length substantially exceeds an overall outline length of a base portion of each of the void cells.

4. The cushioning structure of claim 1, wherein an outwardly curved surface depth substantially recesses from an overall outline of a base portion of each of the void cells.

5. The cushioning structure of claim 1, wherein each of the void cells includes:
a base portion that includes only the inwardly curved surfaces; and
a peak portion that includes both the outwardly curved surfaces and the inwardly curved surfaces.

6. The cushioning structure of claim 1, wherein each of the void cells includes a dome-shaped peak portion.

7. The cushioning structure of claim 1, wherein an overall outline of a base portion of each of the void cells is rectangular, and wherein radii of the outwardly curved surfaces are less than both half a length and half a width of the rectangular overall outline of the base portion.

8. A method of manufacturing a cellular cushioning system comprising:
molding a first array of elastically deformable void cells, some of the void cells of the first array include four sidewalls forming a rectangular outline, at least two of the sidewalls including only one outwardly curved surface and at least two inwardly curved surfaces, and wherein the outwardly curved surfaces constitute at least 20% of the overall exterior surface area of each void cell;
molding a second array of elastically deformable void cells, some of the void cells of the second array include four sidewalls forming a rectangular outline, at least two of the sidewalls including only one outwardly curved surface and at least two inwardly curved surfaces, and wherein the outwardly curved surfaces constitute at least 20% of the overall exterior surface area of each void cell; and
attaching peak surfaces of peak portions of void cells in the first array of void cells to peak surfaces of peak portions of void cells in the second array of void cells, wherein the resulting cellular cushioning system is elastically deformable over at least 10% of its stroke, wherein each of the molded void cells of the resulting cellular cushioning system are open to atmosphere.

9. The method of claim 8, wherein a perimeter length substantially exceeds an overall outline length of a base portion of each of the molded void cells.

10. The method of claim 8, wherein an outwardly curved surface depth substantially recesses from an overall outline of a base portion of each of the molded void cells.

11. The method of claim 8, wherein each of the molded void cells includes:
a base portion that includes only the inwardly curved surfaces; and
a peak portion that includes both the outwardly curved surfaces and the inwardly curved surfaces.

12. The method of claim 8, wherein each of the molded void cells includes a dome-shaped peak portion.

* * * * *